US011172539B2

(12) United States Patent
Takano et al.

(10) Patent No.: US 11,172,539 B2
(45) Date of Patent: Nov. 9, 2021

(54) BASE STATION AND TERMINAL DEVICE

(71) Applicant: Sony Corporation, Tokyo (JP)

(72) Inventors: Hiroaki Takano, Saitama (JP);
Hiromasa Uchiyama, Tokyo (JP);
Naoki Kusashima, Kanagawa (JP);
Kazuyuki Shimezawa, Kanagawa (JP);
Hiroki Matsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 14 days.

(21) Appl. No.: 16/349,631

(22) PCT Filed: Oct. 17, 2017

(86) PCT No.: PCT/JP2017/037480
§ 371 (c)(1),
(2) Date: May 14, 2019

(87) PCT Pub. No.: WO2018/096839
PCT Pub. Date: May 31, 2018

(65) Prior Publication Data
US 2019/0349950 A1    Nov. 14, 2019

(30) Foreign Application Priority Data
Nov. 22, 2016    (JP) .............................. JP2016-227052

(51) Int. Cl.
*H04W 84/04*    (2009.01)
*H04W 76/27*    (2018.01)
(Continued)

(52) U.S. Cl.
CPC ......... *H04W 84/047* (2013.01); *H04W 68/02* (2013.01); *H04W 72/085* (2013.01);
(Continued)

(58) Field of Classification Search
CPC .................................................. H04W 84/047
See application file for complete search history.

(56) References Cited

U.S. PATENT DOCUMENTS 10,148,340 B1 *  12/2018  Bales ..................... H04W 76/25
2010/0103864 A1 *  4/2010  Ulupinar ............... H04W 40/22
                                                                370/315
(Continued)

FOREIGN PATENT DOCUMENTS

EP    2 268 096 A2    12/2010
EP    2 268 097 A2    12/2010
(Continued)

OTHER PUBLICATIONS

Partial European Search Report dated Aug. 7, 2019 in European Application No. 17873179.0-1218.
(Continued)

*Primary Examiner* — Jason E Mattis
(74) *Attorney, Agent, or Firm* — Xsensus LLP

(57) ABSTRACT

To provide a mechanism capable of flexibly constructing backhaul including a wireless communication path.
Provided is a base station including: a processing unit that is connected to backhaul including a first logical interface with a first control entity related to a control plane and a second logical interface with a second control entity related to a user plane. Both a communication route in which the first logical interface is formed and a communication route in which the second logical interface is formed include wireless communication paths formed between a first base station and a second base station.

7 Claims, 23 Drawing Sheets

(51) Int. Cl.
*H04W 76/10* (2018.01)
*H04W 68/02* (2009.01)
*H04W 72/08* (2009.01)
*H04W 92/12* (2009.01)

(52) U.S. Cl.
CPC .......... *H04W 76/10* (2018.02); *H04W 76/27* (2018.02); *H04W 92/12* (2013.01)

(56) References Cited

U.S. PATENT DOCUMENTS

| | | | |
|---|---|---|---|
| 2012/0014314 A1* | 1/2012 | Chen | H04W 84/047 370/315 |
| 2012/0099461 A1* | 4/2012 | Yi | H04B 7/2606 370/252 |
| 2012/0250601 A1 | 10/2012 | Choi et al. | |
| 2013/0089022 A1* | 4/2013 | Lu | H04W 36/08 370/315 |
| 2019/0074876 A1* | 3/2019 | Kakishima | H04L 5/0007 |
| 2020/0022059 A1* | 1/2020 | Kamei | H04L 45/122 |

FOREIGN PATENT DOCUMENTS

| | | |
|---|---|---|
| EP | 2 416 530 A1 | 2/2012 |
| JP | 2007-129772 A | 5/2007 |
| JP | 2013-80986 A | 5/2013 |
| JP | 2014-504838 A | 2/2014 |
| JP | 2015-505207 A | 2/2015 |
| JP | 2015-512193 A | 4/2015 |
| WO | 2013/076876 A1 | 5/2013 |
| WO | 2013/086410 A2 | 6/2013 |
| WO | 2016/140403 A1 | 9/2016 |

OTHER PUBLICATIONS

International Search Report and Written Opinion dated Jan. 16, 2018 for PCT/JP2017/037480 filed on Oct. 17, 2017, 19 pages including translation of the International Search Report.
Extended European Search Report dated Nov. 4, 2019, issued in corresponding European Patent Application No. 17873179.0.
Communication pursuant to Article 94(3) EPC dated Dec. 15, 2020, in European Patent Application No. 17 873 179.0.

* cited by examiner

BASE STATION AND TERMINAL DEVICE

CROSS-REFERENCE TO RELATED APPLICATIONS

The present application is based on PCT filing PCT/JP2017/037,480, filed Oct. 17, 2017 which claims priority to JP 2016-227052, filed Nov. 22, 2016, the entire contents of each are incorporated herein by reference.

TECHNICAL FIELD

The present disclosure relates to a base station and a terminal device.

BACKGROUND ART

In a cellular system, a base station is connected to a core network via backhaul and provides wireless services to slave terminal devices on the basis of control using the core network. Although the backhaul is typically formed on a wired communication path, replacement of a part of a communication path with a wireless communication path has been studied in recent years. In particular, studies regarding backhaul including a wireless communication path using a so-called millimeter waveband (a high frequency band from a 30 to 70 GHz band) have progressed.

For example, Patent Literature 1 discloses a technology of constructing an autonomous distributed network by transmitting beacons between access points in a wireless system other than a cellular system.

CITATION LIST

Patent Literature

Patent Literature 1: JP 2007-129772A

SUMMARY OF INVENTION

Technical Problem

In an environment in which a wired communication path is assumed, backhaul is fixedly provided, and a route, an operating method, and the like are not dynamically changed. However, in a case in which the backhaul is formed to include a wireless communication path, it is desirable that backhaul be able to be flexibly constructed in accordance with movement of a base station, a change in environment, or the like.

Thus, the present disclosure provides a mechanism capable of flexibly constructing backhaul including a wireless communication path.

Solution to Problem

According to the present disclosure, there is provided a base station including: a processing unit that is connected to backhaul including a first logical interface with a first control entity related to a control plane and a second logical interface with a second control entity related to a user plane. Both a communication route in which the first logical interface is formed and a communication route in which the second logical interface is formed include wireless communication paths formed between a first base station and a second base station.

Moreover, according to the present disclosure, there is provided a base station including: a processing unit that is connected to backhaul including a first logical interface with a control entity related to a control plane using a wireless communication path to another base station and that provides a notification of information related to the backhaul while including the information in system information.

Moreover, according to the present disclosure, there is provided a base station including: a processing unit that performs authentication processing for connecting to backhaul including a logical interface with a control entity using a wireless communication path to a first base station that is connected to the backhaul.

Moreover, according to the present disclosure, there is provided a base station including: a processing unit that is connected to backhaul including a logical interface with a control entity using a wireless communication path to first base stations that are connected to the backhaul, relays connection of one or more second base stations on a downstream side to the backhaul using a wireless communication path to the second base stations, and provides a notification of a connection request for connection to the backhaul to a third base station using a wireless communication path to the third base station.

Moreover, according to the present disclosure, there is provided a terminal device including: a processing unit that performs, on backhaul including a first logical interface with a control entity related to a control plane, processing based on information that is provided as a notification from a base station connected using a wireless communication path to another base station, that is included in system information, and that relates to the backhaul.

Advantageous Effects of Invention

As described above, according to the present disclosure, a mechanism capable of flexibly constructing backhaul including a wireless communication path is provided. Note that the effects described above are not necessarily limitative. With or in the place of the above effects, there may be achieved any one of the effects described in this specification or other effects that may be grasped from this specification.

DESCRIPTION OF EMBODIMENTS

Figure 1:
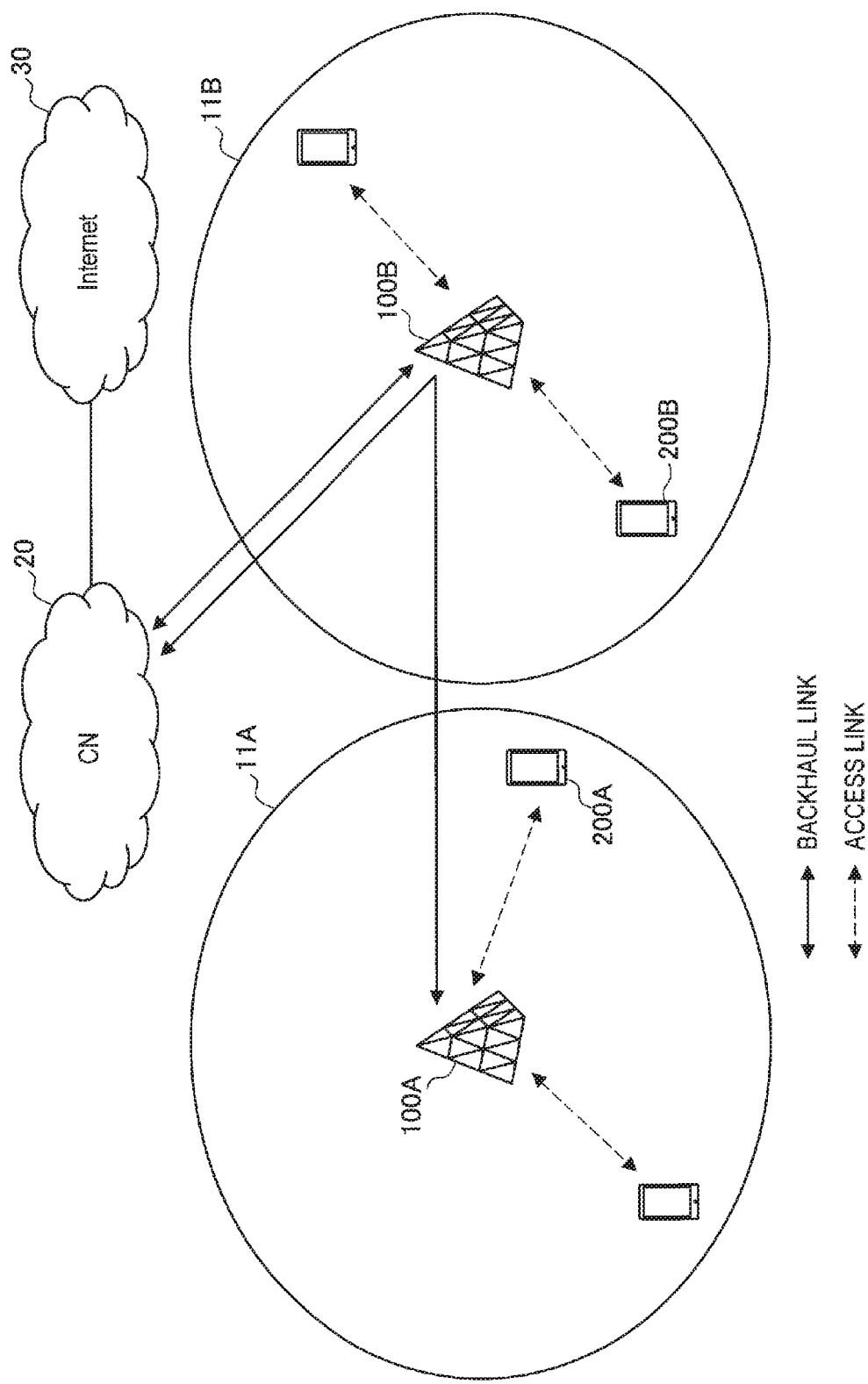
FIG. 1 is a diagram illustrating an overall configuration of a cellular system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are cases in which elements having substantially the same function are distinguished by adding different alphabets to the end of the same reference numeral. For example, a plurality of elements having substantially the same functional configuration are distinguished as necessary like base stations 100A, 100B, and 100C. However, in a case where it is unnecessary to distinguish each of the plurality of elements having substantially the same functional configuration, only the same reference numeral is added. For example, in a case where it is unnecessary to particularly distinguish base stations 100A, 100B, and 100C, they are referred to as simply as a "base station 100."

Further, the description will proceed in the following order.
1. Introduction
1.1. Overall configuration
1.2. Concerning S1 setup
2. Configuration examples of devices
2.1. Configuration example of base station
2.2. Configuration of terminal device
2.3. Configuration example of MEC server
3. First Embodiment
3.1. Technical problem
3.2. Technical features
4. Second Embodiment
4.1. Technical problem
4.2. Technical features
5. Third Embodiment
5.1. Technical problem
5.2. Technical features
6. Forth embodiment
6.1. Technical problem
6.2. Technical features
7. Fifth Embodiment
7.1. Technical problem
7.2. Technical features
8. Sixth Embodiment
8.1. Technical problem
8.2. Technical features
9. Application examples
10. Conclusion 1. Introduction <1.1. Overall Configuration>

First, an overall configuration of a cellular system 1 according to an embodiment of the present disclosure will be described with reference to FIG. 1.

FIG. 1 is a diagram illustrating an overall configuration of the cellular system 1 according to the present embodiment. As illustrated in FIG. 1, the cellular system 1 includes a plurality of base stations 100, a plurality of terminal devices 200, a core network (CN) 20, and the Internet 30.

The base stations 100 operate cells 11 and provide a wireless service to one or more terminal devices 200 located in the cells 11. For example, a base station 100A operates a cell 11A and provides a wireless service to a terminal device 200A. Similarly, a base station 100B operates a cell 11B and provides a wireless service to a terminal device 200B. The cells 11 are operated in accordance with an arbitrary wireless communication scheme such as LTE or New Radio (NR), for example. The base stations 100 are connected to the core network 20. The core network 20 is connected to the Internet 30 via a gateway device (not illustrated).

A network between the base stations 100 and the core network 20 is also referred to as a backhaul link or backhaul. Also, a network between the base stations 100 and the terminal devices 200 is also referred to as an access link. Typically, the backhaul is formed on a wired communication path, and the access link is formed on a wireless communication path. For example, the base station 100B is connected to the core network 20 in a wired manner. Meanwhile, in the present embodiment, there is a case in which the backhaul is connected by way of a wireless communication path (that is, a wireless relay). For example, the base station 100A is connected to the core network 20 using a wireless communication path to the base station 100B. In other words, the base station 100A is connected to the backhaul using the wireless communication path to the base station 100B. Hereinafter, a technology related to a base station connected to backhaul using a wireless communication path to other base stations, such as the base station 100A, will mainly be disclosed.

The terminal devices 200 perform wireless communication with the base stations 100 on the basis of control performed by the base stations 100. For example, the terminal devices 200 transmit uplink signals to the base stations 100 and receive downlink signals from the base stations 100.

Next, the backhaul will be described in further detail with reference to FIGS. 2 and 3.

Figure 2:
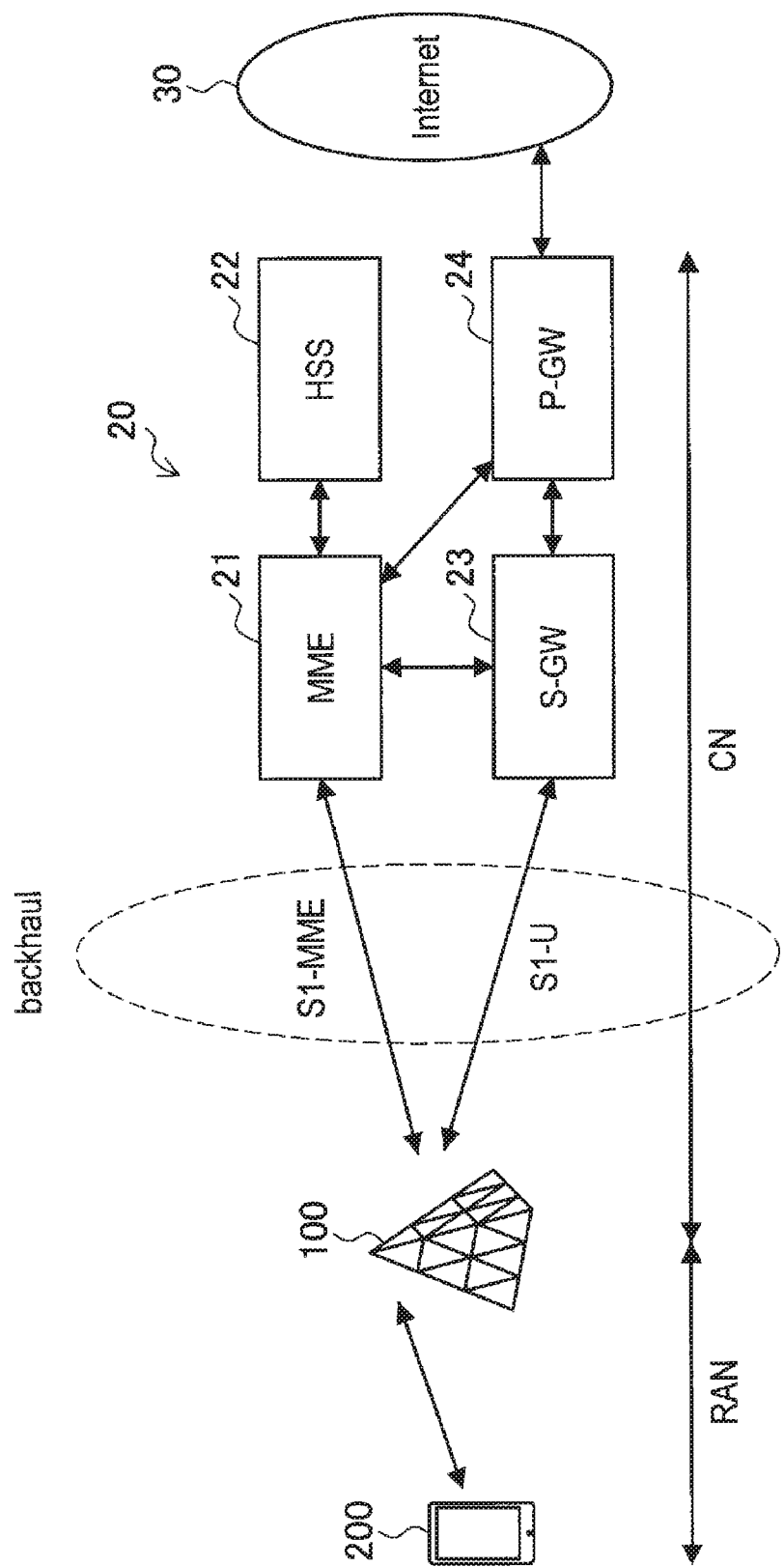
FIG. 2 is a diagram for explaining backhaul according to the embodiment.

FIG. 2 is a diagram for explaining the backhaul according to the present embodiment. As illustrated in FIG. 2, the cellular system 1 includes a radio access network (RAN) and the CN (core network 20). The RAN is a network formed by the base stations 100 and the terminal devices 200, and the base stations 100 and the terminal devices 200 are connected to each other with a wireless interface. In LTE, the interface is also referred to as a Uu interface.

Meanwhile, the respective entities are typically connected with a wired interface on an upstream side of the base station 100 (that is, on the side of the core network 20). The core network 20 includes control entities such as a mobility management entity (MME) 21, a home subscriber server (HSS) 22, a serving gateway (S-GW) 23, and a packet data network gateway (P-GW) 24. In particular, the MME 21 and the HSS 22 are control entities related to a control plane. The MME 21 performs session management when communication is started. The HSS 22 stores subscriber contract information. Also, the S-GW 23 and the P-GW 24 are control entities related to a user plane. The S-GW 23 serves as an anchor point when the terminal devices 200 perform handover between the base stations 100. The P-GW 24 is a connection point between the Internet 30 and the core network 20.

The backhaul connecting the base stations 100 and the core network 20 includes an S1-MME interface between the base stations 100 and the MME 21 and an S1-U interface between the base stations 100 and the S-GW 23. The S1-MME interface is an interface (corresponding to a first logical interface) with a control entity related to a control plane (for example, the MME 21), and a signal of the control plane is supplied thereto. The S1-U interface is an interface (corresponding to a second logical interface) with a control entity related to a user plane (for example, the S-GW 23) and is an interface to which a signal of the user plane is supplied. Therefore, it is possible to state that the backhaul includes the S1-MME interface that is backhaul of the control plane and the S1-U interface that is backhaul of the user plane.

In recent years, formation of this backhaul, which had been formed on a wired communication path, on a wireless communication path has been studied. In particular, studies related to backhaul including a wireless communication path using a so-called millimeter waveband have advanced. One example thereof will be described with reference to FIG. 3.

Figure 3:
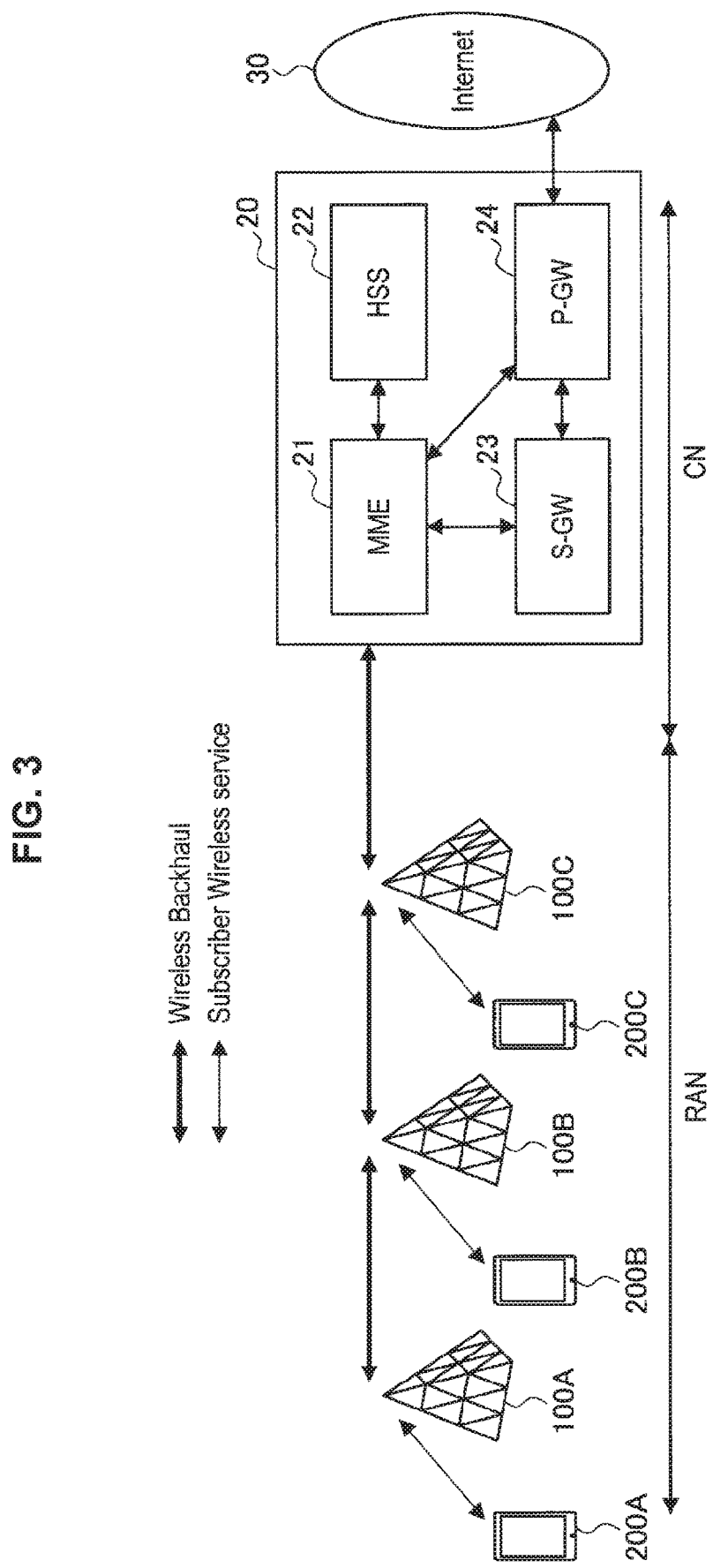
FIG. 3 is a diagram for explaining backhaul according to the embodiment.

FIG. 3 is a diagram for explaining the backhaul according to the present embodiment. As illustrated in FIG. 3, backhaul is formed by way of a wireless communication path between the base stations 100. In this case, traffic of the base station 100A to the core network 20 reaches the core network 20 by way of a wireless communication path between a base station 100A and a base station 100B and a wireless communication path between the base station 100B and a base station 100C. In this case, each base station 100 that relays the communication between the base station 100 on the downstream side and the backhaul performs relay for the base station 100 on the downstream side while providing a wireless service to the terminal devices 200 using an ordinary subscriber-based wireless access interface such as LTE or HSDPA.

Such backhaul is also considered to be able to be configured by simply replacing a part of the communication routes in which the S1-MME interface and the S1-U interface are formed with a wireless communication path. In such a case, it is not necessary to change an existing protocol on the assumption of wired connection. However, since such backhaul is fixedly provided, it is difficult to dynamically change the route and/or an operation state.

Thus, a mechanism capable of flexibly constructing backhaul including a wireless communication path will be disclosed below.

<1.2. Concerning S1 Setup>

In order to register base stations 100 in the core network 20, an S2 setup procedure is used. Hereinafter, an example of a flow of the S1 setup procedure will be described with reference to FIG. 4.

Figure 4:
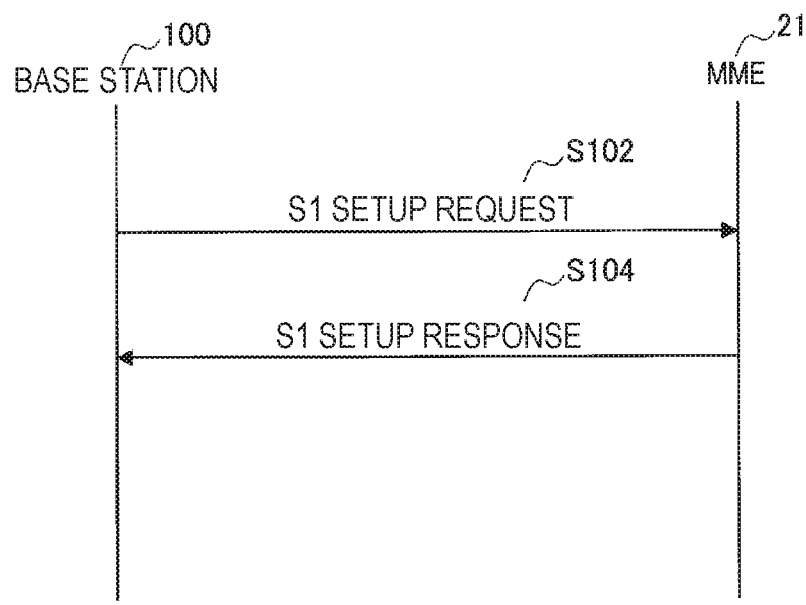
FIG. 4 is a sequence diagram illustrating an example of a flow of a typical S1 setup procedure.

FIG. 4 is a sequence diagram illustrating an example of a flow of a typical S1 setup procedure. As illustrated in FIG. 4, the base station 100 and the MME 21 are involved in this sequence. First, the base station 100 transmits an S1 setup request to the MME 21 (Step S102). Note that the base station 100 transmits the S1 setup request to the MME 21 using a known default IP address of the MME 21. Then, the MME 21 transmits an S1 setup response to the base station 100 in a case in which the MME 21 accepts the base station 100 (Step S104).

Execution of the aforementioned S1 setup procedure is conceivable even when the backhaul including wireless communication paths is used. However, the S1 setup procedure is based on the assumption of execution between the base station 100 and the MME 21 connected in a wired manner, between which connection is not lost. Meanwhile, there is a probability of connection established using the S1 setup procedure being lost in the backhaul including the wireless communication paths, particularly, backhaul including wireless relays (that is, wireless communication paths) in multiple stages. That is, there is a probability of a connection failure occurring in the S1 setup. If a case in which the backhaul including the wireless communication paths is applied to smaller-scaled base stations is assumed, for example, a case in which the wireless communication paths between the small-scaled base stations are blocked by objects, traveling vehicles, and the like is conceivable. Further, if the backhaul including the wireless communication paths is widely distributed, frequency bands used for the backhaul are limited, and this may lead to interference.

As for the S1-MME interface and the S1-U interface, cases similar to the aforementioned case of the connection failure may occur. After the S setup is completed, the S1-MME interface is established. Then, the S1-U interface is established between the P-GW 24 and the base station 100 designated by the MME 21. Note that the connection failure in the S1 set up is substantially synonymous with the connection failure in the S1-MME. This is because the S1-AP protocol for the S1 setup is a protocol in the S1-MME interface.

Here, protocol stacks of the S1-MME interface and the S1-U interface will be described with reference to FIGS. 5 and 6.

Figure 5:
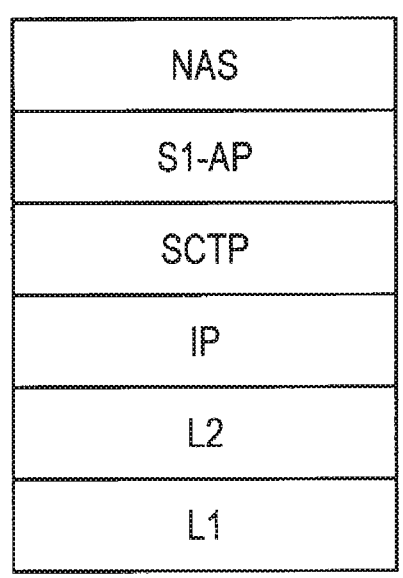
FIG. 5 is a diagram illustrating a protocol stack of an S1-MME interface.

FIG. 5 is a diagram illustrating a protocol stack of the S1-MME interface. As illustrated in FIG. 5, the protocol stack of the S1-MME interface includes L1, L2, an Internet protocol (IP), a stream control transmission protocol (SCTP), S1-AP, and a non-access stratum (NAS). L1 and L2 are protocols that provide a wireless interface. IP is an Internet protocol. SCTP is a protocol that realizes retransmission. S1-AP is a protocol for a signal procedure between the base station 100 and the MME 21. S1-AP is established by the S1 setup. NAS is a protocol for signal exchange between a terminal device 200 and the MME 21. On the basis of the above description, it is possible to recognize the protocol stack from L1 to S1-AP as backhaul for carrying NAS.

Figure 6:
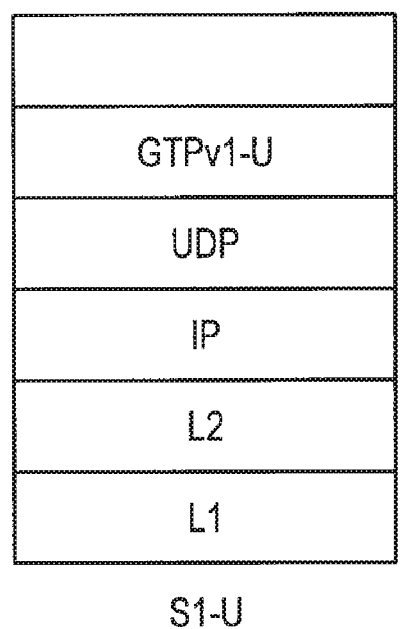
FIG. 6 is a diagram illustrating a protocol stack of an S1-U interface.

FIG. 6 is a diagram illustrating a protocol stack of the S1-U interface. As illustrated in FIG. 6, the protocol stack of the S1-U interface includes L1, L2, IP, a user datagram protocol (UDP), and a general packet radio service (GPRS) tunneling protocol (GTP) v1-U. UDP is a protocol that does not perform retransmission. GTPv1-U is a tunneling protocol between a terminal device 200 and the S-GW 23. Note that the tunneling protocol is a protocol for placing an arbitrary protocol on a protocol. GTPv1-U is established for each terminal device 200 when the terminal device 200 is connected to a network, and user data is exchanged on GTPv1-U. On the basis of the above description, it is possible to regard the protocol stack from L 1 to UDP as backhaul for carrying GTPv1-U and user data thereon.

2. Configuration Example of Each Device

<2.1. Configuration Example of Base Station>

Figure 7:
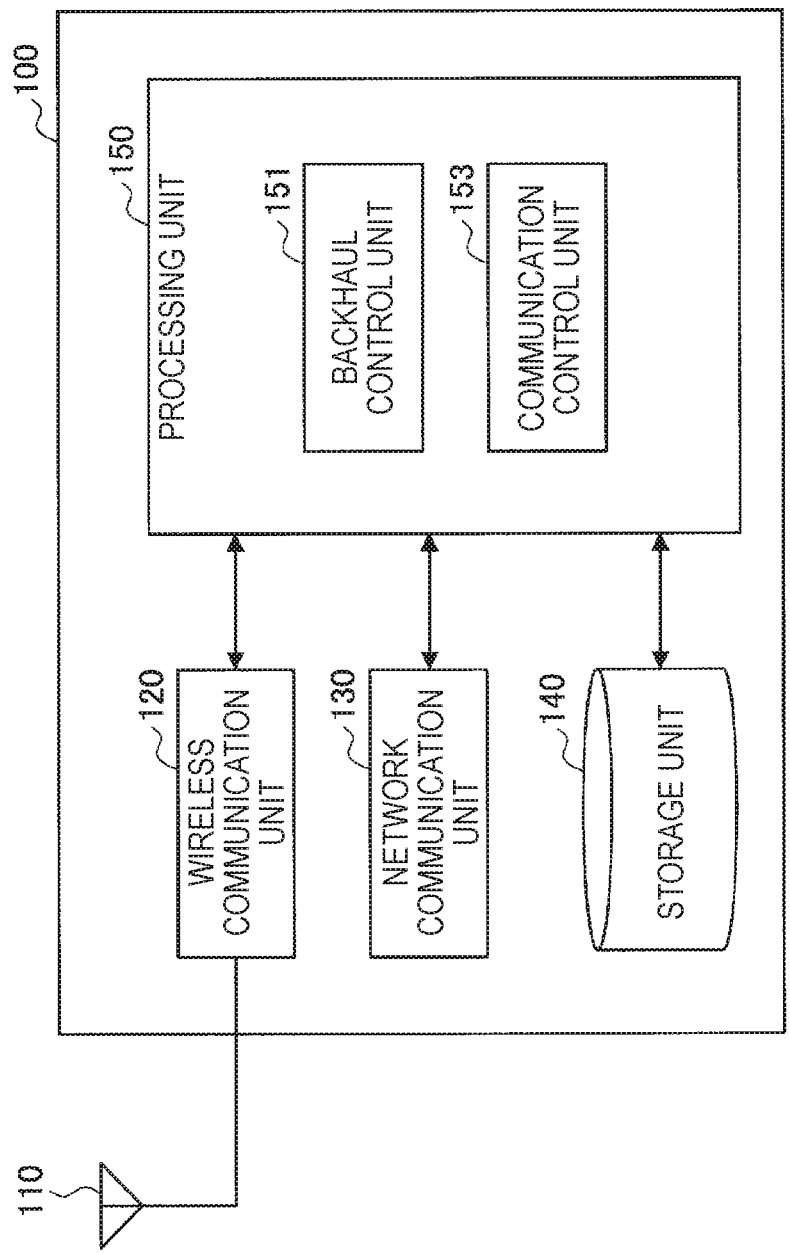
FIG. 7 is a block diagram illustrating an example of a configuration of a base station according to the present embodiment.

FIG. 7 is a block diagram illustrating an example of a configuration of the base station 100 according to an embodiment of the present disclosure. Referring to FIG. 7, the base station 100 includes an antenna unit 110, a wireless communication unit 120, a network communication unit 130, a storage unit 140, and a processing unit 150.

(1) Antenna Unit 110

The antenna unit 110 radiates a signal output from the wireless communication unit 120 into a space as a radio wave. Further, the antenna unit 110 converts the radio wave in the space into a signal and outputs the signal to the wireless communication unit 120.

(2) Wireless Communication Unit 120

The wireless communication unit 120 transmits and receives signals. For example, the wireless communication unit 120 transmits a downlink signal to the terminal device and receives an uplink signal from the terminal device.

(3) Network Communication Unit 130

The network communication unit 130 transmits and receives information. For example, the network communication unit 130 transmits information to other nodes and receives information from other nodes. For example, the other nodes include other base stations and core network nodes.

(4) Storage Unit 140

The storage unit 140 temporarily or permanently stores a program and various data for an operation of the base station 100.

(5) Processing Unit 150

The processing unit 150 provides various functions of the base station 100. The processing unit 150 includes a backhaul control unit 151 and a communication control unit 153. The backhaul control unit 151 performs control related to the backhaul. For example, the backhaul control unit 151 provides a notification of information related to the backhaul to other base stations 100 or terminal devices 200 or controls connection to the backhaul via the wireless communication paths that is provided from other base stations 100 or to other base stations 100. The communication control unit 153 provides a wireless service to a terminal device 200 which is connected to the communication control unit 153 itself. Further, the processing unit 150 may further include other components than the above-described components. In other words, the processing unit 150 may also perform operations other than the operations of the above-described components.

<2.2. Configuration of Terminal Device>

Figure 8:
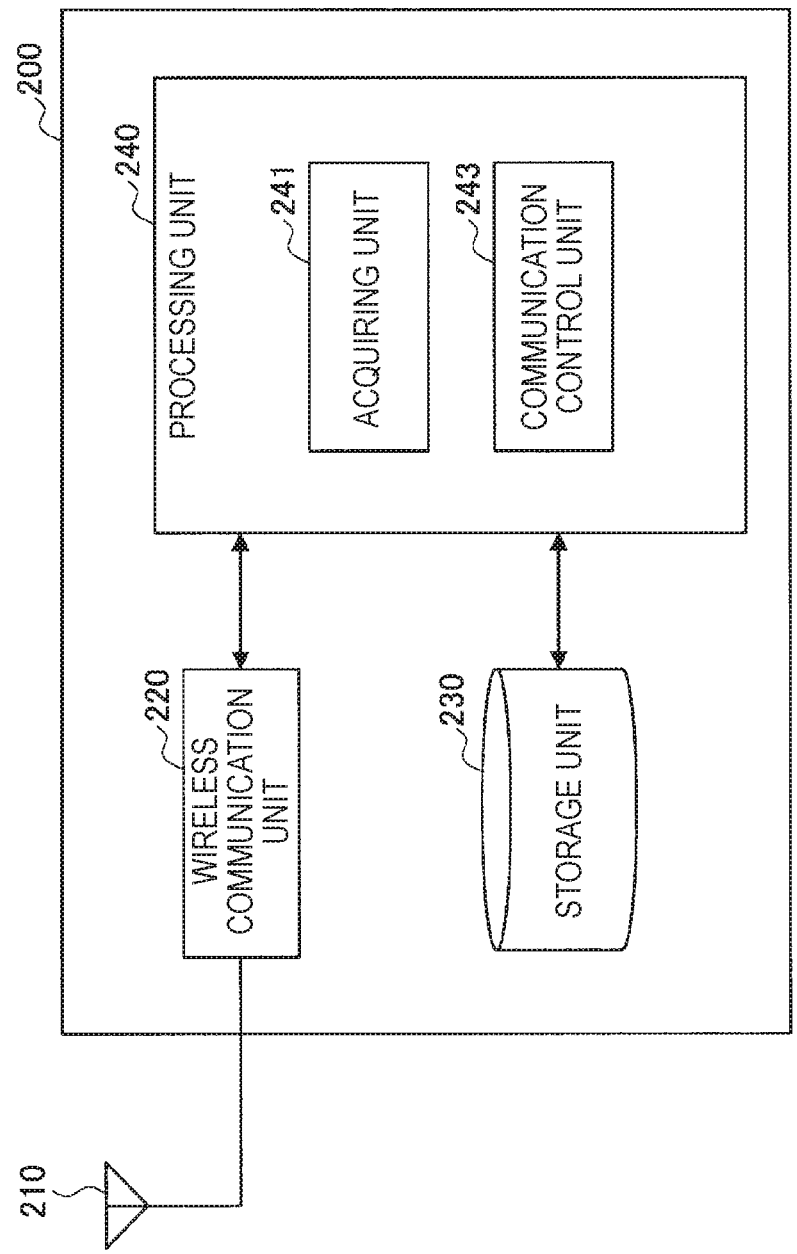
FIG. 8 is a block diagram illustrating an example of a configuration of a terminal device according to the present embodiment.

FIG. 8 is a block diagram illustrating an example of a configuration of the terminal device 200 according to an embodiment. Referring to FIG. 8, the terminal device 200 includes an antenna unit 210, a wireless communication unit 220, a storage unit 230, and a processing unit 240.

(1) Antenna Unit 210

The antenna unit 210 radiates a signal output from the wireless communication unit 220 into a space as a radio wave. Further, the antenna unit 210 converts the radio wave in the space into a signal and outputs the signal to the wireless communication unit 220.

(2) Wireless Communication Unit 220

The wireless communication unit 220 transmits and receives signals. For example, the wireless communication unit 220 receives a downlink signal from the base station and transmits an uplink signal to the base station.

(3) Storage Unit 230

The storage unit 230 temporarily or permanently stores a program and various data for an operation of the terminal device 200.

(4) Processing Unit 240

The processing unit 240 provides various functions of the terminal device 200. The processing unit 240 includes an acquiring unit 241 and a communication control unit 243. The acquiring unit 241 acquires the information related to the backhaul that is included in system information provided as a notification from the base station 100, RRC signaling, or the like. The communication control unit 243 performs processing based on the information related to the backhaul. For example, the communication control unit 243 performs switching to another frequency resource or handover to other base stations 100. Further, the processing unit 240 may further include other components than the above-described components. In other words, the processing unit 240 may also perform operations other than the operations of the above-described components.

3. First Embodiment

In the present embodiment, a configuration of backhaul common to the respective embodiments will be described in detail.

<3.1. Technical Problem>

The S1-MME interface also includes a protocol for the S setup. Therefore, if the backhaul related to the S1-MME interface is formed to include a wireless communication path using a high frequency (for example, 70 GHz to 100 GHz) such as a millimeter waveband, it is considered that disadvantages may occur when a base station is registered in the MME. If connection between the base station and the MME becomes unstable, a state in which the base station is not registered in the MME occurs, and it becomes difficult for the terminal device to use the base station. This is because the base station typically stops transmission of all signals including basic signals such as signals for synchronization and system information indicating performance of the base station in a case in which the connection to the MME has been lost. In consideration of the fact that the backhaul is relayed in multiple stages (multi-hopping) by the wireless communication paths between the base stations 100, it is desirable that the number of the relay stages be smaller.

Also, if some of the wireless communication paths of the wireless relays in the multiple stages are stable while other wireless communication paths are unstable, an unstable wireless communication path becomes a bottleneck, and as a result, the backhaul may become unstable. Therefore, it is desirable that quality of the wireless communication paths included in the communication route in which the backhaul is formed be secured at a minimum.

Thus, a mechanism for improving stability of the backhaul including the wireless communication paths will be described below in terms of the number of relay stages and relay quality described above.

<3.2. Technical Features>

Number of Relay Stages

Hereinafter, technical features for realizing an appropriate number of relay stages will be described with reference to FIGS. 9 and 10.

Figure 9:
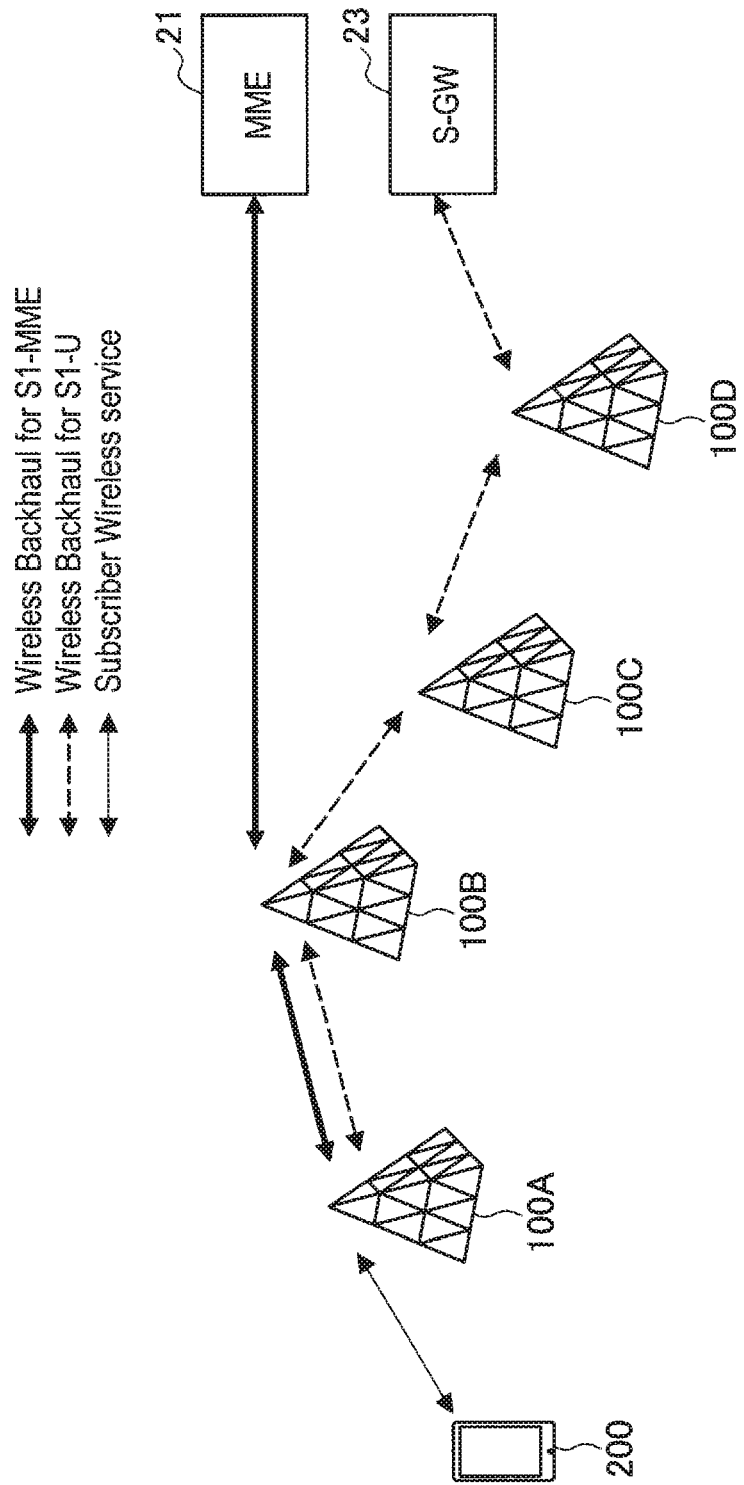
FIG. 9 is a diagram for explaining technical features according to a first embodiment.

FIG. 9 is a diagram for explaining technical features according to the present embodiment. As illustrated in FIG. 9, the base station 100A forms each of the S1-MME interface and the S1-U interface on a communication route including a wireless communication path. For example, the S1-MME interface is formed on a communication route by way of the base station 100B. Also, the S1-U interface is formed on a communication route by way of base stations 100B, 100C, and 100D. Note that forming of the S1-MME interface or the S1-U interface is synonymous with connection to the S1-MME interface or the S1-U interface.

Both the communication path in which the S1-MME interface is formed and the communication path in which the S1-U interface is formed may include the same wireless communication path. In the example illustrated in FIG. 9, both the communication path in which the S1-MME interface is formed and the communication path in which the S1-U interface is formed include a wireless communication path that is formed between the base station 100A and the base station 100B. In this manner, the S1-MME interface and the S1-U interface may coexist on the same physical interface.

Meanwhile, the communication path in which the S1-MME interface is formed and the communication path in which the S1-U interface is formed may include mutually different wireless communication paths. In the example illustrated in FIG. 9, the communication path in which the S1-U interface is formed includes a wireless communication path formed between the base station 100B and the base station 100C and a wireless communication path formed in the base station 100C and the base station 100D, unlike the communication path in which the S1-MME interface is formed. In this manner, the S1-MME interface and the S1-U interface may be formed on different physical interfaces.

On the wireless communication path in which the S1-MME interface or the S1-U interface is formed, signals of base stations 100 on the downstream side on which the number of relays from the MME 21 or the S-GW 23 is larger are multiplexed. In the example illustrated in FIG. 9, a signal of the base station 100A, a signal of the base station 100B, and a signal of the base station 100C are multiplexed on the wireless communication path formed between the base station 100C and the base station 100D. In other words, the base station 100C multiplexes the signal of the base station 100C itself, the signal of the base station 100B, and the signal of the base station 100A and transmits or receives the multiplexed signals.

The base stations 100 on the communication route in which the S1-MME interface or the S1-U interface is formed transparently transfer a signal from the downstream side to the upstream side or a signal from the upstream side to the downstream side. For example, the base station 100B transparently transfers a signal to the MME 21, which has been received from the base station 100A, to the MME 21 and transparently transfers a signal to the base station 100A, which has been received from the MME 21, to the base station 100A.

In this manner, features of the backhaul including the wireless communication paths enable flexible construction of backhaul. For example, it is possible to use a common wireless communication path or different wireless communication paths among a plurality of interfaces and to perform more efficient communication through multiplexing and transparent transfer of packets.

Also, the base stations 100 are connected to the S1-MME interface by way of a smaller number of base stations as compared with those of the S1-U interface. For example, the base station 100A is connected to the S1-MME interface by way of the base station 100B, namely by way of a smaller number of base stations than those of the S1-U interface that is connected by way of the base stations 100B, 100C, and 100D. This may mean that the base station 100 selects other base stations 100 to which the base station 100 is connected by forming a wireless communication path for connection to the S1-MME interface in accordance with the number of base stations by way of which the base station 100 establishes connection. Under such control, the base station 100 can connect to the S1-MME interface related to the control plane with higher priority than in the case of the S1-U interface related to the user plane via wireless relays in a smaller number of stages. In this manner, since stability of the S1-MME interface is improved, the base station 100 can stably provide a wireless service to the terminal devices 200. The reduction of the number of base stations 100 by way of which connection is established may also be described as utilization of a frequency resource of a lower frequency. In this regard, description will be given with reference to FIG. 10.

Figure 10:
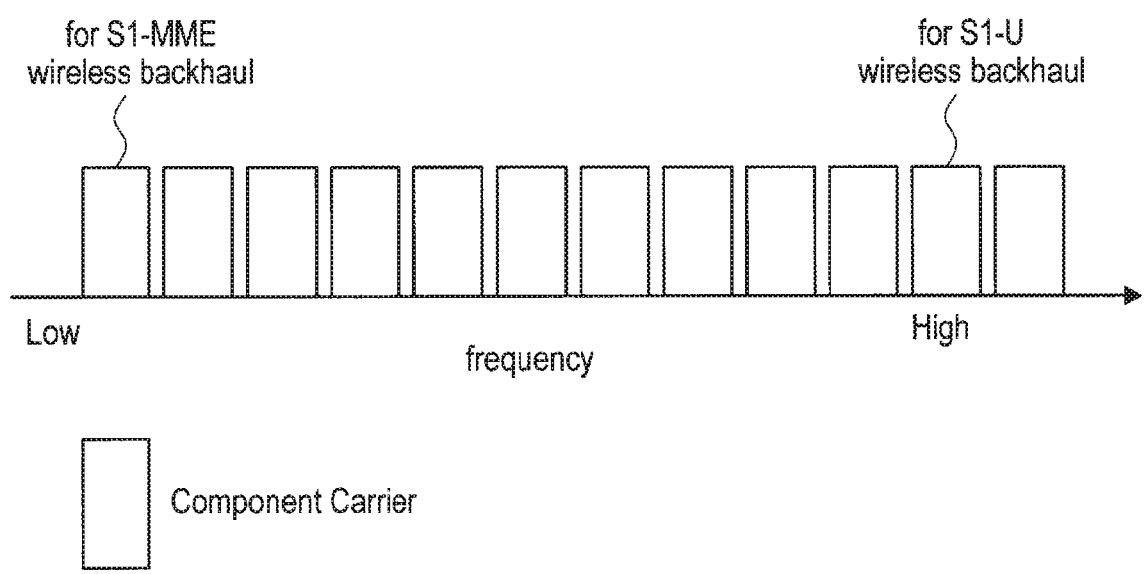
FIG. 10 is a diagram for explaining technical features according to the embodiment.

FIG. 10 is a diagram for explaining technical features according to the present embodiment. As illustrated in FIG. 10, the base station 100 forms a wireless communication path for the S1-MME interface using a frequency resource (for example, a component carrier) of a lower frequency than that of the wireless communication path for the S1-U interface. Since a communicable distance increases as the frequency is lower, it is possible to realize reduction of the number of relay stages by using a frequency resource of a low frequency. The base station 100 can be connected to the S1-MME interface via wireless relays in a smaller number of stages by using a frequency resource of a low frequency. In this manner, since stability of the S1-MME interface is improved, the base station 100 can stably provide a wireless service to the terminal devices 200.

In order to establish connection to the S1-MME interface using the frequency resource of a lower frequency, the base station 100 executes the S1 setup procedure using the frequency resource of the lower frequency. Then, the base station 100 is connected to the S1-MME interface by way of other base stations 100 that are transmission destinations of an S1 setup request. Meanwhile, the base station 100 is connected to the S1-U interface using a frequency resource of a high frequency among frequency resources provided from other base stations 100 connected to the S-GW 23. Note that connection to the S1-MME interface by way of other base stations 100 may mean connection to the S1-MME interface to which other base stations 100 have already been connected. The same applies to the S1-U interface.

Also, the base station 100 may form the wireless communication path for the S1-MME interface using a frequency resource of a frequency that is less influenced by rainfall. For example, the base station 100 forms the S1-MME interface while avoiding a frequency with large rainfall attenuation, such as a 70 GHz band or an 80 GHz band. In this manner, since stability of the S1-MME interface is improved, the base station 100 can stably provide a wireless service to the terminal devices 200.

Relay Quality

Hereinafter, technical features for securing relay quality in a communication route will be described.

The base station 100 exchanges information related to a communication route in which the S1-MME interface or the S1-U interface is formed with other base stations 100. The exchanged information is also referred to as route information. The route information may include information regarding a frequency band requested in relation to wireless communication paths included in the communication route in which the backhaul is formed and a minimum frequency band or a maximum frequency band that is currently used in practice, for example. Also, the route information may include at least any of a delay request, a signal-to-noise (SN) ratio request, or a reliability request in relation to the wireless communication paths included in the communication route in which the backhaul is formed. The route information may be separately managed for one related to the S1-MME interface and for one related to the S1-U interface.

The base station 100 can be connected to the backhaul while avoiding other base stations 100 that may become unallowable bottleneck by the route information being exchanged among the base stations 100. Also, the base station 100 can select a frequency resource suitable for the connection to the backhaul on the basis of the exchanged route information.

The route information may be periodically or nonperiodically exchanged. For example, the base station 100 may include the route information in the S1 setup request. Also, the route information may be exchanged not only when the wireless communication paths are established but also after the wireless communication paths are established. In the latter case, the base station 100 can perform maintenance such that more desirable backhaul is formed by changing the frequency resource used for the backhaul or the like.

An example of the route information is illustrated in Tables 1 to 3 below.

TABLE 1

Example of route information

| Item | Value |
|---|---|
| Required frequency band | 26 GHz |
| Maximum frequency band in route | 50 GHz |
| Minimum frequency band in route | 20 GHz |

The above example illustrated in Table 1 illustrates that although utilization of component carriers of equal to or less than 26 GHz is requested for all the wireless communication paths included in the communication route, there is a wireless communication path using a component carrier of 50 GHz, in practice.

TABLE 2

Example of route information

| Item | | Value |
|---|---|---|
| S1-MME | Required frequency band | 26 GHz |
| S1-MME | Maximum frequency band in route | 50 GHz |
| S1-MME | Minimum frequency band in route | 20 GHz |
| S1-U | Required frequency band | 100 GHz |
| S1-U | Maximum frequency band in route | 70 GHz |
| S1-U | Minimum frequency band in route | 30 GHz |

In the above example illustrated in Table 2, the route information related to the S1-MME interface is separated from the route information related to the S1-U interface.

TABLE 3

Example of route information

| Item | | Value |
|---|---|---|
| S1-MME | Required SN | 30 dB |
| S1-MME | Maximum SN in route | 26 dB |
| S1-MME | Minimum SN in route | 10 dB |
| S1-U | Required SN | 30 dB |
| S1-U | Maximum SN in route | 15 dB |
| S1-U | Minimum SN in route | 5 dB |

In the above example illustrated in Table 3, SN requests in all the wireless communication paths included in the communication route and the actual maximum SN and minimum SN are included in the route information.

It is assumed that the backhaul in each of the following embodiments is backhaul including the aforementioned wireless communication paths.

4. Second Embodiment

The present embodiment is a mode in which base stations 100 connected to backhaul including wireless communication paths provide a stable wireless service to slave terminal devices 200 even if the wireless communication paths included in the backhaul are unstable.

<4.1. Technical Problem>

In a case in which connection with the MME has not been completed or in a case in which connection with the MME has been lost, a typical base station stops transmission of all signals including basic signals such as signals for synchronization and system information indicating capability of the base station. Specifically, in the S1-MME interface, an SCTP protocol has a function of Keep-Alive, periodically exchanges packets between the base station and the MME, and constantly monitors whether or not the line has been interrupted. In a case in which the line is interrupted and it is not possible to perform communication through the communication paths used in the S set up, the base station may fail in many cases even of the base station retransmits the S1 setup request. Since the base station stops the transmission of all the signals to the terminal devices during that time, the terminal devices connected to the base station have no choice other than giving up the connection to the base station once.

In consideration of a case in which the S1-MME interface is formed on a communication route including more unstable wireless communication paths than in a case of wired connection, it is desirable that the wireless service to the terminal devices be not stopped even in the case in which the wireless communication paths are unstable.

<4.2. Technical Features>

Maintenance of the Downlink Communication

In a case in which the S1-MME interface is disconnected, the base station 100 transmits a predetermined signal to the terminal devices 200 until a predetermined time (corresponding to a first predetermined time) is reached. For example, the predetermined signal include at least any of a reference signal, a synchronization signal, or system information. Note that the reference signal described here may be an arbitrary downlink reference signal such as a cell-specific reference signal (CRS) or a channel state information reference signal (CSI-RS). In addition, the synchronization signal may be a primary synchronization signal (PSS) or a secondary synchronization signal (SSS), or the reference signal may be used as the synchronization signal. Also, the system information may be a master information block (MIB) or a system information block (SIB). Even in a case in which the connection between the base station 100 and the MME 21 has been lost, the terminal devices 200 can continue the connection to the base station 100 and receive the provided wireless service by the transmission of the predetermined signal being continued.

In particular, the base station 100 is connected to the backhaul using the wireless communication paths to other base stations 100 and provides a notification of information related to the backhaul while including the information in the system information. The information related to the backhaul may include information indicating a state of the control plane. For example, the information related to the backhaul may include information indicating that the S1-MME interface has been disconnected. Also, the information indicating that the S1-MME interface has been disconnected may include information indicating that the connection is being restored before the aforementioned predetermined time is reached or may include information indicating that restoring has been failed after the predetermined time is reached. Also, the information related to the backhaul may include information indicating a state of the user plane. For example, the information related to the backhaul may include information indicating that the S1-U interface has been disconnected. Note that the disconnection described here means that any of the wireless communication paths on the communication route in which the S1-MME interface or the S1-U interface is formed has been disconnected. An example of a state of backhaul that is provided as a notification while being included in the system information is illustrated in Table 4 below.

TABLE 4

Example of state of backhaul

| State | S1-MME interface | S1-U interface |
|---|---|---|
| A | Disconnected | Disconnected |
| B | Disconnected | Satisfactory |
| C | Satisfactory | Disconnected |

In a case of a state B, for example, the base station 100 provides a notification of system information including that the state is the state B to the terminal devices 200. In the state B, the S1-MME interface has been disconnected while the S1-U interface maintains satisfactory connection. In this case, since a procedure that does not require communication of the S1-MME interface can be performed, the base station 100 continues the communication as long as it is not necessary to perform a procedure of a control system such as initial attachment, paging, or generation of a bearer corresponding to another QoS. In that case, the base station 100 can perform communication using the S1-U interface until a session that has already been established ends. The base station 100 performs downlink and uplink scheduling for it and continuously provides data transmission and reception services to the terminal devices 200. Note that the initial attachment is a procedure of registering a terminal device 200 in a network in a case in which the terminal device 200 to which power supply has been stopped is turned on. The paging is a procedure of calling a telephone incoming call for the terminal devices 200.

Note that the base station 100 stops downlink data transmission in a case in which the S1-U interface has been disconnected. Also, the base station 100 may stop the downlink data transmission even in a case in which the connection to the S1-U interface is maintained if the S1-MME interface has been disconnected.

In a case in which the S1-MME interface has been restored before the predetermined time is reached, the base station 100 returns to an ordinary state and continues the wireless service to the terminal devices 200. Meanwhile, in a case in which the predetermined time is reached without the S1-MME interface being restored, the base station 100 stops the transmission of the predetermined signal to the terminal devices 200.

States of the terminal devices 200 may be either an RRC connection state or an RRC idle state until the S1-MME interface is restored or the predetermined time is reached after the S1-MME interface is disconnected.

Figure 11:
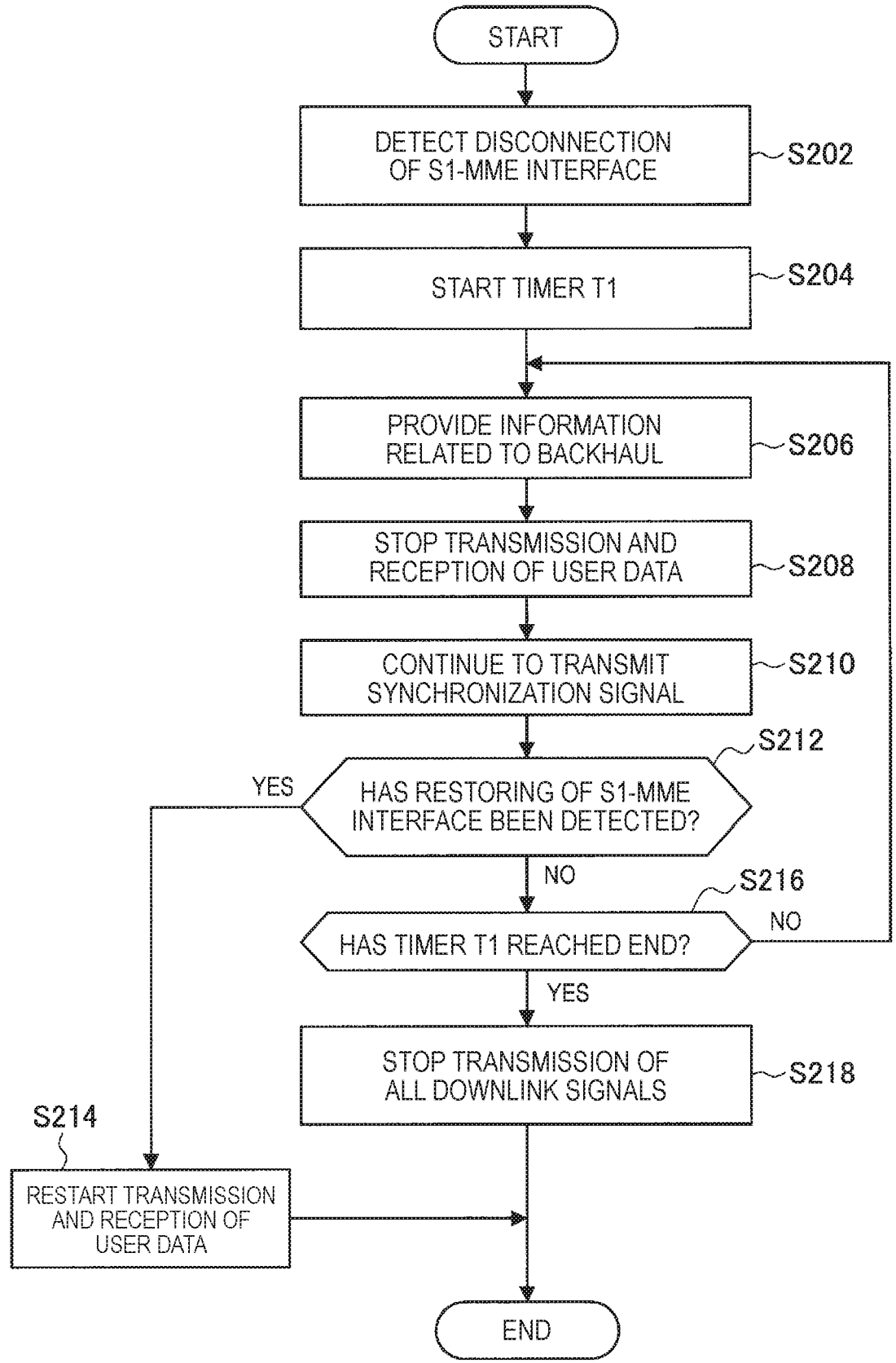
FIG. 11 is a flowchart illustrating an example of a flow of processing when an S1-MME interface is disconnected by a base station according to a second embodiment.

A flow of the aforementioned processing related to maintenance of downlink communication will be describe with reference to FIG. 11.

FIG. 11 is a flowchart illustrating an example of a flow of processing when the S1-MME interface is disconnected, which is performed by the base station 100 according to the embodiment. As illustrated in FIG. 11, if disconnection of the S1-MME interface is detected (Step S202), the base station 100 first starts a timer T1 (Step S204). Then, the base station 100 provides the information related to the backhaul to the terminal devices 200 while including the information in the system information (Step S206). Next, the base station 100 stops transmission and reception of user data (Step S208) and continues to transmit the synchronization signal (Step S210). In a case in which restoring of the S1-MME interface is detected (Step S212/YES), then the base station 100 restarts the transmission and the reception of the user data (Step S214).

Meanwhile, in a case in which restoring of the S1-MME interface is not detected (Step S212/NO), the base station 100 determines whether or not the timer T1 has reached the end (Step S216). In a case in which it is determined that the timer T1 has not reached the end (Step S216/NO), the processing returns to Step S206.

Meanwhile, in a case in which it is determined that the timer T1 has reached the end (Step S216/YES), the base station 100 stops the transmission of all the downlink signals (Step S218).

Maintenance of Uplink Communication

The downlink has been described above. Next, the uplink will be described.

In a case in which the S1-MME interface has been disconnected, the base station 100 accumulates uplink data from the terminal devices 200 until a predetermined time (corresponding to a second predetermined time) is reached or until the S1-MME interface is restored. Specifically, the base station 100 continues to receive uplink data based on the UL scheduling for the terminal devices 200 and uplink data with no UL scheduling (that is, grant less UL data) for a predetermined time. Then, the base station 100 replies with a response signal (ACK or NACK) in response to the received uplink data as a response signal in an L1/L2 level to the terminal devices 200 and accumulates received information in an internal buffer.

Then, the base station 100 deletes the accumulated data in a case in which the predetermined time is reached without the S1-MME interface being restored, and transfers the accumulated uplink data in a case in which the S1-MME interface is restored before the predetermined period is reached. In this manner, the terminal devices 200 can perform the uplink communication without being aware of malfunction of the backhaul at all in a case in which the S1-MME interface is restored before the predetermined time is reached after the disconnection.

A flow of processing related to the aforementioned maintenance of uplink communication will be described with reference to FIG. 12.

Figure 12:
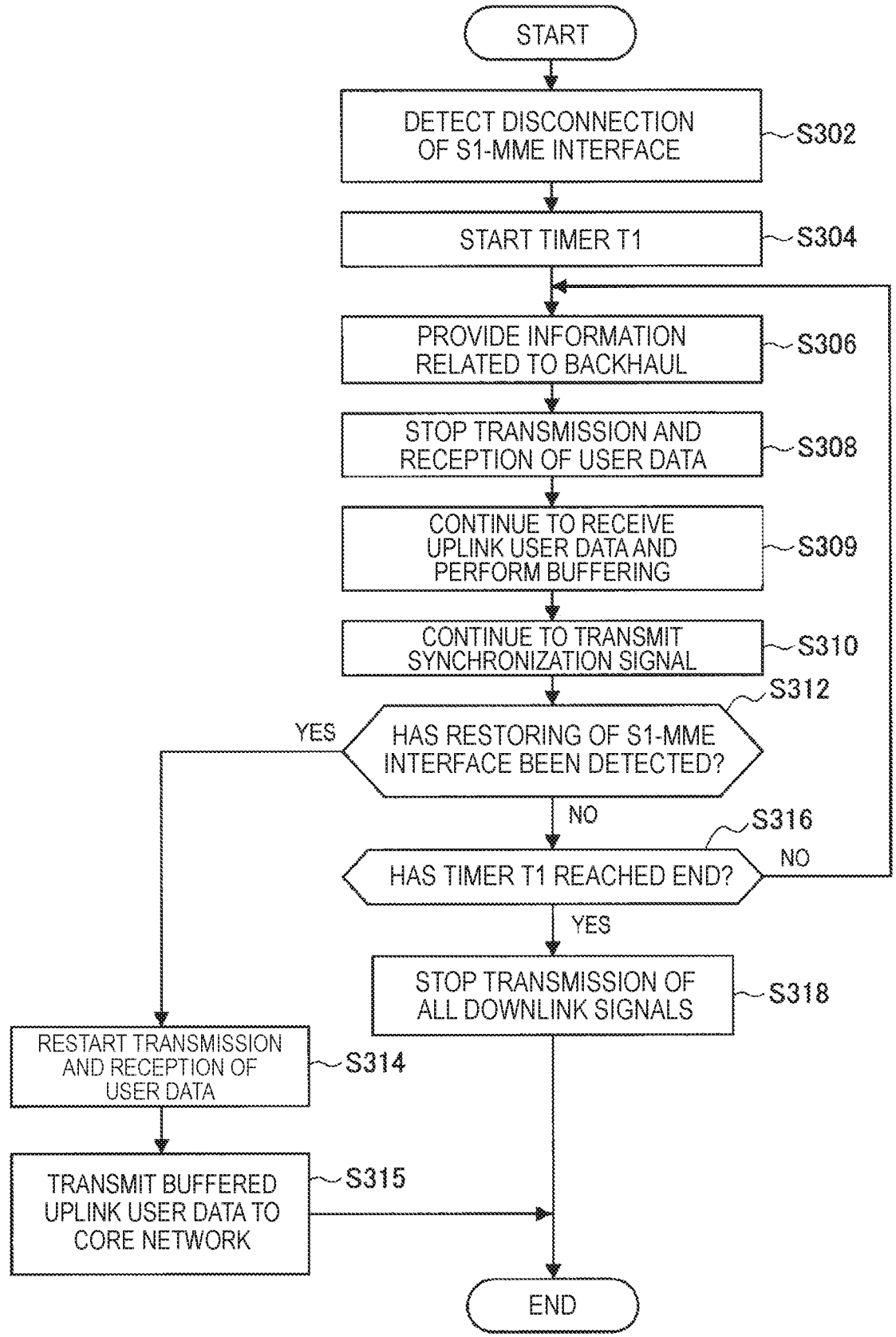
FIG. 12 is a flowchart illustrating an example of a flow of processing when the S1-MME interface is disconnected by the base station according to the embodiment.

FIG. 12 is a flowchart illustrating an example of a flow of processing when the S1-MME interface is disconnected, which is performed by the base station 100 according to the embodiment. As illustrated in FIG. 12, if disconnection of the S1-MME interface is detected (Step S302), the base station 100 first starts a timer T1 (Step 304). Then, the base station 100 provides the information related to the backhaul to the terminal devices 200 while including the information in the system information (Step S306). Next, the base station 100 stops transmission and reception of the user data (Step S308), continues to buffer the reception of uplink user data (Step S309), and continues to transmit the synchronization signal (Step S310). In a case in which restoring of the S1-MME interface is detected (Step S312/YES), then the base station 100 restarts the transmission and the reception of the user data (Step S314) and transmits the buffered uplink user data to the core network 20 (Step S315).

Meanwhile, in a case in which restoring of the S1-MME interface is not detected (Step S312/NO), the base station 100 determines whether or not the timer T1 has reached the end (Step S316). In a case in which it is determined that the timer T1 has not reached the end (Step S316/NO), the processing returns to Step S306.

Meanwhile, in a case in which it is determined that the timer T1 has reached the end (Step S316/YES), the base station 100 stops the transmission of all the downlink signals (Step S318).

Utilization of MEC Server

A typical application server is placed on the internet 30. Meanwhile, there is a case in which an application server is placed at a closer location to the terminal devices 200 for the purpose of reducing a delay and reducing traffics in the core network 20 and the like. Such an application server is also referred to as a mobile edge computing (MEC) server. The MEC server is typically placed at the base station 100 (placed inside the base station 100 or provided outside the base station 100) and provides an application to the terminal devices 200 connected to the base station 100.

In a case in which the S1-MME interface is disconnected, the base station 100 continues to provide the service to the terminal devices 200 using a communicable application server (that is, the MEC server). The MEC server is mounted near the base station 100 or inside the base station 100 in many cases, and the MEC server may be able to communicate with the base station 100 even if the connection to the backhaul is lost. Therefore, the base station 100 can continue to provide the service using the MEC server.

Thus, the base station 100 permits the terminal devices 200 to continuously use the MEC server, transmits downlink data from the MEC server to the terminal devices 200, and transmits uplink data from the terminal devices 200 to the MEC server.

However, the base station 100 stops a procedure that requires signaling with the MME 21 in relation to the provision of the service using the MEC server. Also, the base station 100 may stop the utilization of the MEC server in a case in which a predetermined time is reached after the S1-MME interface is disconnected.

A flow of the processing related to the aforementioned utilization of the MEC server will be described with reference to FIG. 13.

Figure 13:
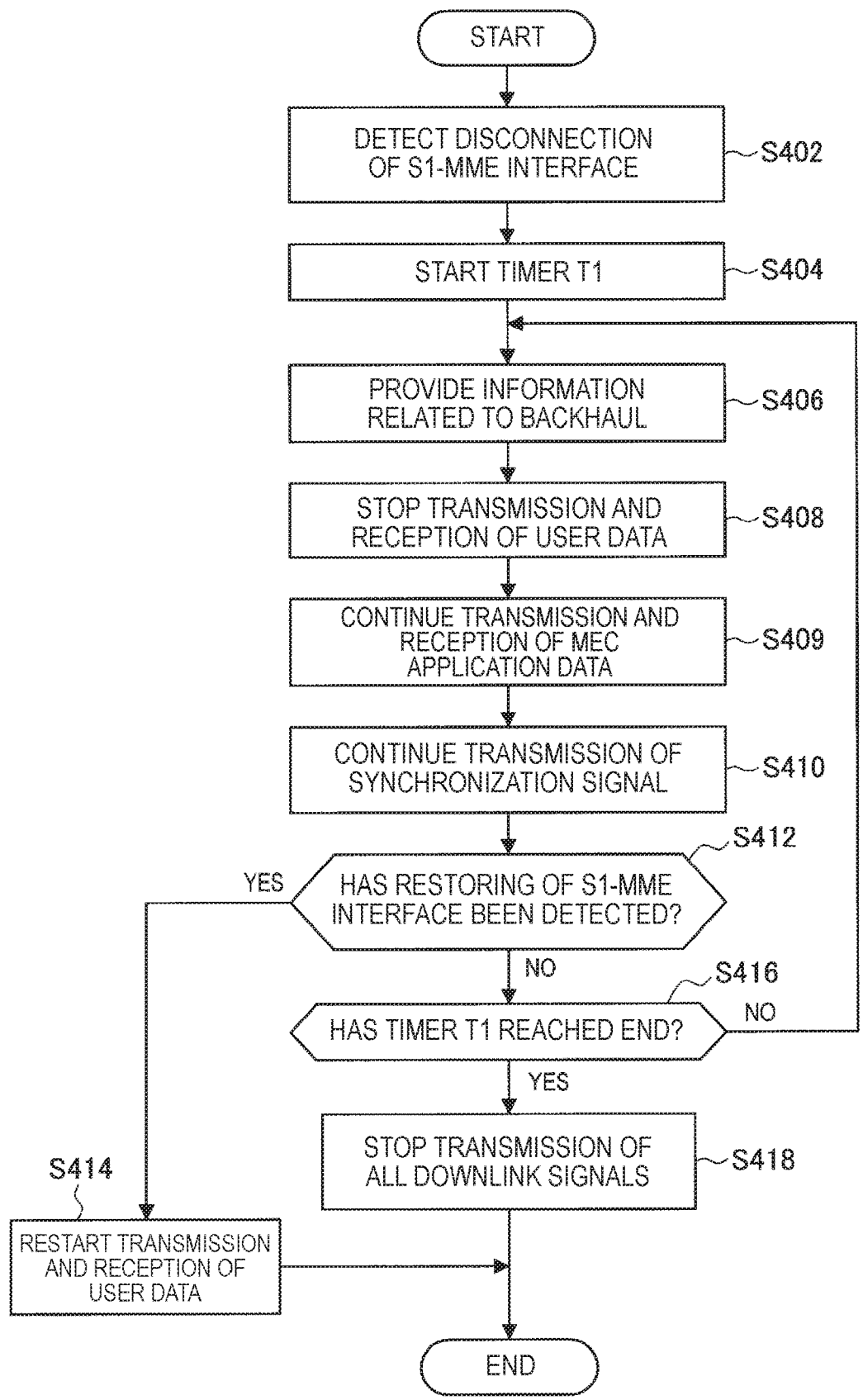
FIG. 13 is a flowchart illustrating an example of a flow of processing when the S1-MME interface is disconnected by the base station according to the embodiment.

FIG. 13 is a flowchart illustrating an example of a flow of processing when the S1-MME interface is disconnected, which is performed by the base station 100 according to the embodiment. As illustrated in FIG. 13, if disconnection of the S1-MME interface is detected (Step S402), the base station 100 first starts a timer T1 (Step S404). Then, the base station 100 provides the information related to the backhaul to the terminal devices 200 while including the information in the system information (Step S406). Next, the base station 100 stops transmission and reception of user data (Step S408), continues to transmit and receive MEC application data using the MEC server (Step S409), and continues to transmit a synchronization signal (Step S410). In a case in which restoring of the S1-MME interface is detected (Step S412/YES), then the base station 100 restarts to transmit and receive the user data (Step S414).

Meanwhile, in a case in which restoring of the S1-MME interface is not detected (Step S412/NO), the base station 100 determines whether or not the timer T1 has reached the end (Step S416). In a case in which it is determined that the timer T1 has not reached the end (Step S416/NO), the processing returns to Step S406.

Meanwhile, in a case in which it is determined that the timer T1 has reached the end (Step S416/YES), the base station 100 stops the transmission of all the downlink signals (Step S418).

5. Third Embodiment

The present embodiment is a mode in which the base station 100 provides a notification of information related to backhaul to which the base station 100 itself is connected to the surroundings in order to assist determination of other base stations 100 or the terminal devices 200.

<5.1. Technical Problem>

As described above, the backhaul may include wireless relays in multiple stages. A delay becomes large in a case in which the number of stages of relays is large, and a delay becomes small in a case in which the number of stages of relays is small. There is a case in which it is desirable that the delay be smaller depending on an application used by the terminal devices.

Also, the base station 100 provides a wireless service to the terminal devices 200 using a plurality of frequency resources (for example, component carriers). All wireless services provided by each of the plurality of frequency resources is not necessarily provided using the same backhaul. A typical terminal device 200 refers to communication quality of the respective frequency resources and select a frequency resource to be used. In an environment in which the backhaul including the wireless communication paths is used, it is desirable that the terminal device 200 be able to select a frequency resource to be used on the basis of the information related to the backhaul.

<5.2. Technical Features>

The base station 100 provides a notification of the information related to the backhaul while including the information in the system information. In particular, the information related to the backhaul according to the embodiment includes information indicating a delay time of the backhaul corresponding to a frequency resource provided by the base station 100. The delay time described here may be a delay time of the S1-MME interface or may be a delay time of the S1-U interface. The terminal devices 200 that have received provision of the information indicating the delay time can be connected to or execute handover on the base station 100 with an allowable delay time. Note that the information indicating the delay time may be a predicted value of the delay time. An example of the predicted value of the delay time included in the system information is illustrated in Table 5 below:

TABLE 5

Example of predicted value of delay time included in system information

| Component carrier | Predicted value of delay time |
|---|---|
| A | 100 ms |
| B | 500 ms |
| C | 80 ms |
| D | 2000 ms |

As illustrated above in Table 5, the information indicating the delay time may be provided for each frequency resource. The terminal devices 200 that have received provision of such information can select wireless resources with allowable delay time.

Note that the information related to the backhaul that is provided as a notification to the terminal devices 200 may include information indicating other base stations 100 to be connected. For example, a so-called white list may be included in the system information. The terminal devices 200 can be connected to an appropriate base station 100 in the neighborhood with reference to the white list.

Here, a delay time of a certain base station 100 is a total of delay times of the respective wireless relays on the communication route of the backhaul to which the base station 100 is connected. In this regard, description will be given with reference to FIG. 14.

Figure 14:
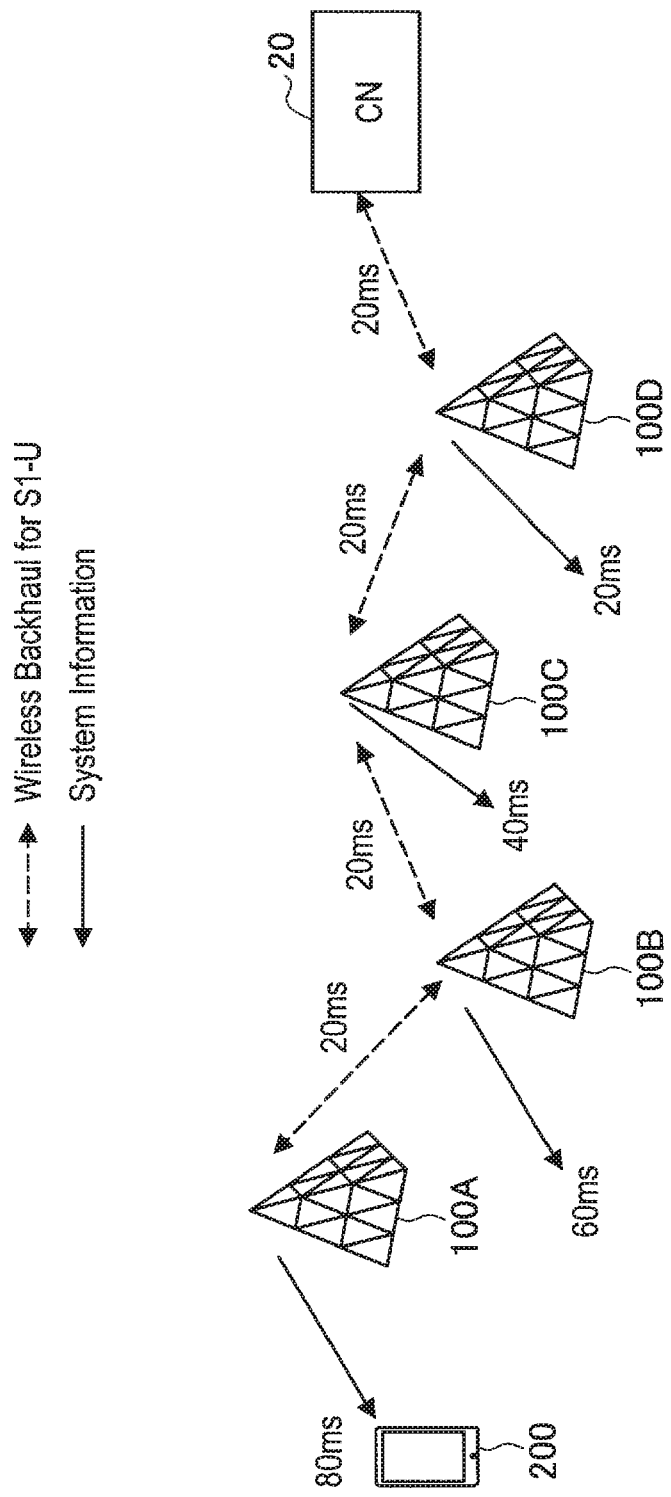
FIG. 14 is a diagram for explaining technical features according to a third embodiment.

FIG. 14 is a diagram for explaining technical features according to the present embodiment. As illustrated in FIG. 14, the delay time increases in accordance with the number of base stations 100, by way of which connection is established. For example, it is assumed that it takes 20 ms to perform wireless communication among the respective base stations 100A to 100D. In that case, since the base station 100D is connected to the network 20 with a delay time of 20 ms, the base station 100D provides a notification of the information indicating that the delay time is 20 ms to the terminal devices 200 while including the information in the system information. Also, since the base station 100C is connected to the base station 100D with a delay time of 20 ms, the base station 100C provides a notification of information indicating that the delay time is 40 ms to the terminal devices 200 while including the information in the system information. In addition, since the base station 100B is connected to the base station 100C with a delay time of 20 ms, the base station 100B provides a notification of information indicating that the delay time is 60 ms to the terminal devices 200 while including the information in the system information. Also, since the base station 100B is connected to the base station 100B with a delay time of 20 ms, the base station 100A provides a notification of information indicating that the delay time is 80 ms to the terminal device 200 while including the information in the system information.

The base station 100 may transmit the information indicating the delay time of the backhaul corresponding to the frequency resource that the base station 100 itself provides to other base stations 100 in order to enables other base stations 100 to calculate the delay time. For example, the information illustrated above in Table 5 may be transmitted to other base stations 100 on further downstream. The base stations 100 can predict the delay time of the base stations 100 themselves on the basis of the information indicating the delay time acquired from the base stations 100 on the upstream. Also, each base station 100 that has received the provision of the information indicating the delay time selects other base stations 100 with allowable delay times and can be connected to the backhaul.

6. Fourth Embodiment

The present embodiment is a mode in which the base station 100 provides a notification of information indicating whether or not to provide connection to the backhaul to which the base station 100 itself is connected to other base stations 100.

<6.1. Technical Problem>

Wireless communication paths included in the backhaul according to the present embodiment may dynamically be changed (added or deleted, for example). For example, a base station 100 that is newly turned on may be connected to a base station 100 in the neighborhood and may be connected to the backhaul. Therefore, it is desirable that the base station 100 select to which of the neighboring base stations 100 the S1 setup request is to be transmitted on the basis of information of the neighboring base stations 100. Here, the S setup request is a request that the base station 100 that attempts to connect to the core network 20 transmits a request to the core network 20 for the first time.

In relation to formation of backhaul on the assumption of wired connection that does not include wireless communication paths, there is a procedure for the base station 100 to automatically acquire an X2 interface with the neighboring base stations 100. The procedure is designed such that the base station 100 inquires the MME21 for the information regarding the neighboring base stations 100 and transmits a request to form the X2 interface to the neighboring base stations 100 on the basis of a result of the inquiry. The X2 interface is an interface among the base stations 100 rather than an interface for establishing connection between the core network 20 and the base stations 100. Therefore, it is not appropriate to use such a procedure in order to obtain information for selecting transmission destinations of the S1 setup request.

As described above, it is desirable to provide a mechanism that enables the base station 100 to obtain the information regarding the neighboring base stations 100 in order to select the transmission destination of the S1 setup request.

<6.2. Technical Features>

The base station 100 provides a notification of the information related to the backhaul while including the information in the system information. In particular, the information related to the backhaul in the present embodiment includes information indicating whether or not it is possible to provide the wireless communication paths for connection to the backhaul to other base stations 100, in other words, information indicating whether or not it is possible to provide the connection to the backhaul to other base stations 100. For example, the base station 100 connected to the backhaul transmits information indicating that the base station 100 can receive the S1 setup request while including the information in the system information. The base station 100 that is not connected to the backhaul can selectively transmit the S1 setup request to the base station 100 that can receive the S1 setup request on the basis of the information and can be connected to the backhaul.

Here, the base station 100 connected to the backhaul can typically provide the connection to the backhaul to other base stations 100. However, whether or not the base station 100 can actually provide the connection depends on capability of the base station 100 (for example, a machine resource or a frequency resource) or a load (for example, the connection to the backhaul has already been provided to other base stations 100). Therefore, in a case in which the base station 100 itself has already been connected to the backhaul and there is a margin in the capability and the load, the base station 100 transmits the information indicating that the base station 100 can provide the connection to the backhaul while including the information in the system information.

A flow of processing related to the aforementioned transmission of the system information will be described with reference to FIG. 15.

Figure 15:
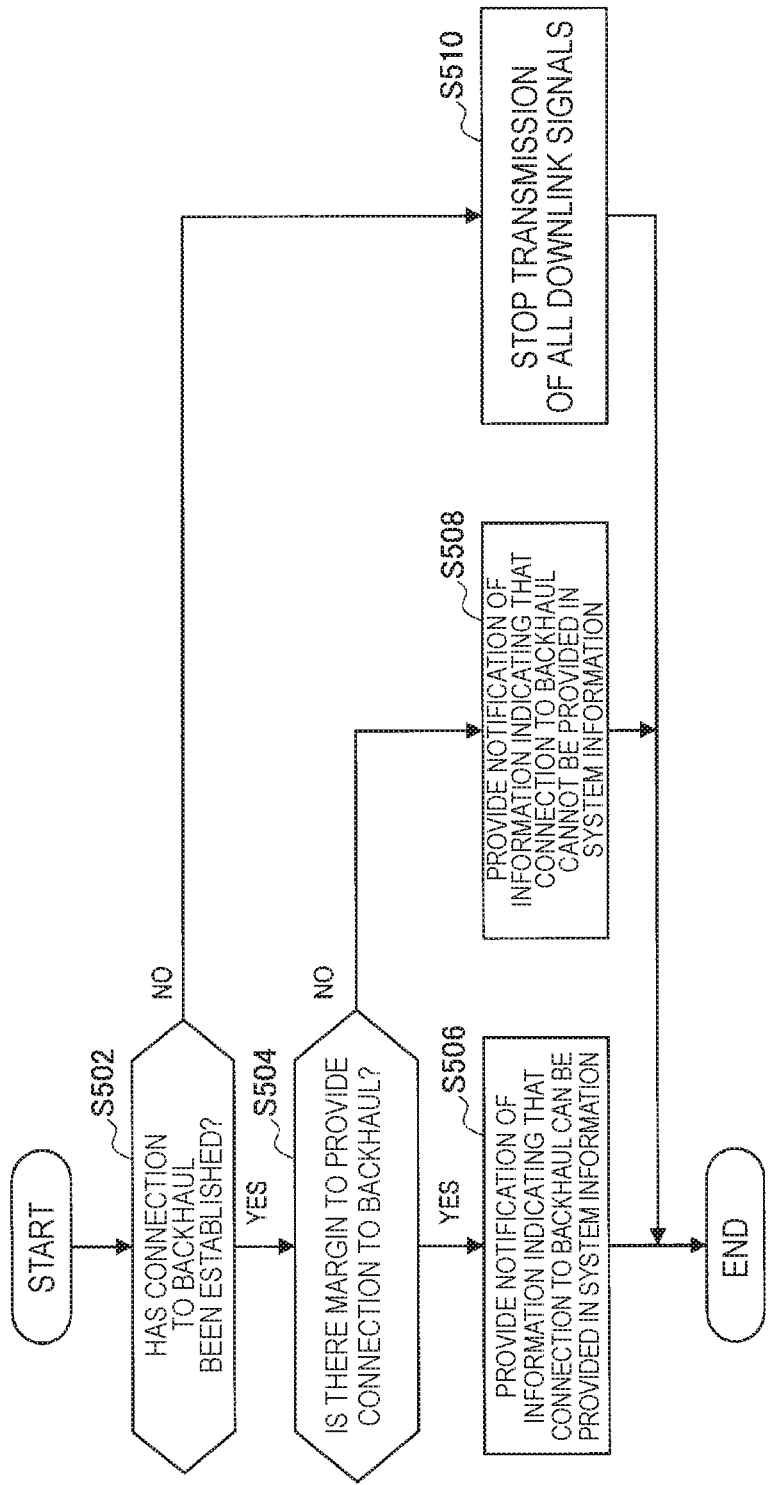
FIG. 15 is a flowchart illustrating an example of a flow of processing of transmitting system information that is performed by a base station according to a fourth embodiment.

FIG. 15 is a flowchart illustrating an example of a flow of processing of transmitting system information that is performed by the base station 100 according to the present embodiment. As illustrated in FIG. 15, the base station 100 first determines whether or not the base station 100 is connected to the backhaul (Step S502). In a case in which it is determined that the base station 100 is connected to the backhaul (S502/YES), the base station 100 determines whether or not there is a margin for providing the connection to the backhaul (Step S504). In a case in which it is determined that there is a margin for providing the connection to the backhaul (S504/YES), the base station 100 provides a notification of information indicating that the base station 100 can provide the connection to the backhaul in system information (Step S506). Meanwhile, in a case in which it is determined that there is a no margin to provide the connection with the backhaul (S504/NO), the base station 100 provides a notification of information indicating that the base station 100 cannot provide the connection to the backhaul in the system information (Step S508). Also, in a case in which it is determined that the base station 100 is not connected to the backhaul (S502/NO), the base station 100 stops transmission of all downlink signals (Step S510).

7. Fifth Embodiment

The present embodiment is a mode in which restriction for using backhaul including wireless communication paths is imparted on the base station 100.

<7.1. Technical Problem>

In an environment on the assumption of backhaul formed to include only wired connection, an operator manages connection between the base station 100 and a control entity of the core network 20 such as the MME 21 or the S-GW 23. Even if there may be a case in which the base station 100 and the control entity are connected to each other via wireless communication paths of micrometer waves, such connection is a stationary connection managed by the operator, and the connection is not dynamically changed. Therefore, no security problems have occurred even if authentication for the base station 100 to use the backhaul is not performed.

In relation to the backhaul including the wireless communication paths, there is a concern that a problem of unnecessary utilization of resources of the backhaul may occur if a base station 100 that uses a frequency resource, which is a shared electric wave resource and has been used for the backhaul, appears. Also, security should also be taken into consideration since the wireless communication paths included in the backhaul may dynamically be changed outside the operator's management.

Therefore, it is desirable that a mechanism for the base station 100 to perform authentication for connection to the backhaul including the wireless communication paths (that is, authentication for connection to the core network 20 via the wireless communication paths) be provided.

In such a mechanism, the base station 100 performs authentication for connection to the core network 20 in a case in which it is possible to use the backhaul including the wireless communication paths. Thereafter, the terminal devices 200 perform authentication for connection to the network. Table 6 below illustrates a list of authentication processing to be performed in relation to the backhaul including the wireless communication paths.

TABLE 6

List of authentication processing

| Type of authentication processing | Explanation |
| --- | --- |
| Authentication for base station to use backhaul | Not present |
| Authentication for base station to be connected to core network | A technology of incorporating a USIM on a base station and performs authentication on the basis of information of the USIM is present. However, authentication is not performed in a wireless manner and is performed by way of wired backhaul. |
| Authentication for terminal device to be connected to core network | The authentication is performed in cellular communication such as LTE. |

<7.2. Technical Features>

For example, the base station 100 searches for other base stations 100 in the neighborhood that are connected to the backhaul at a timing at which power is turned on, at a timing of movement, or the like and attempts to establish connection to the backhaul via the wireless communication paths to other base stations 100. At that time, the base station 100 performs authentication processing for the connection to the backhaul using the wireless communication paths to other base stations 100 that are connected to the backhaul. That is, the base station 100 performs the authentication processing for the connection to the backhaul. In this manner, only permitted base stations 100 can be connected to the backhaul, and security is secured.

Various methods for a procedure of the authentication processing are conceivable. Hereinafter, a first procedure and a second procedure will be described on the assumption that a base station that is not connected to backhaul is a base station 100A (corresponding to a second base station) and a base station that has already been connected thereto is a base station 100B (corresponding to a first base station) in one example.

First Procedure

First, the base station 100A serves as a terminal device that is connected to and performs wireless communication with the base station 100B and performs authentication processing. For example, the base station 100A incorporates a subscriber identity module (SIM) card and performs an attachment procedure using SIM information. In this manner, the base station 100A can perform authentication with the core network 20 by way of the base station 100B and can be connected to the network as a terminal device.

The base station 100A that is connected to the base station 100B as a terminal device transmits a request for connection to the backhaul to the base station 100B. The base station 100B replies with information indicating connection availability in response to the request to the connection to the backhaul from the base station 100A. Specifically, the base station 100B inquires the MME 21 for whether or not the request for the connection to the backhaul from the base station 100A is to be permitted. Then, the base station 100B replies with information indicating connection availability in accordance with a result of the inquiry. Note that the request for the connection with the backhaul and the reply thereto may be performed using RRC signaling.

A flow of processing related to the aforementioned transmission of the system information will be described with reference to FIG. 16.

Figure 16:
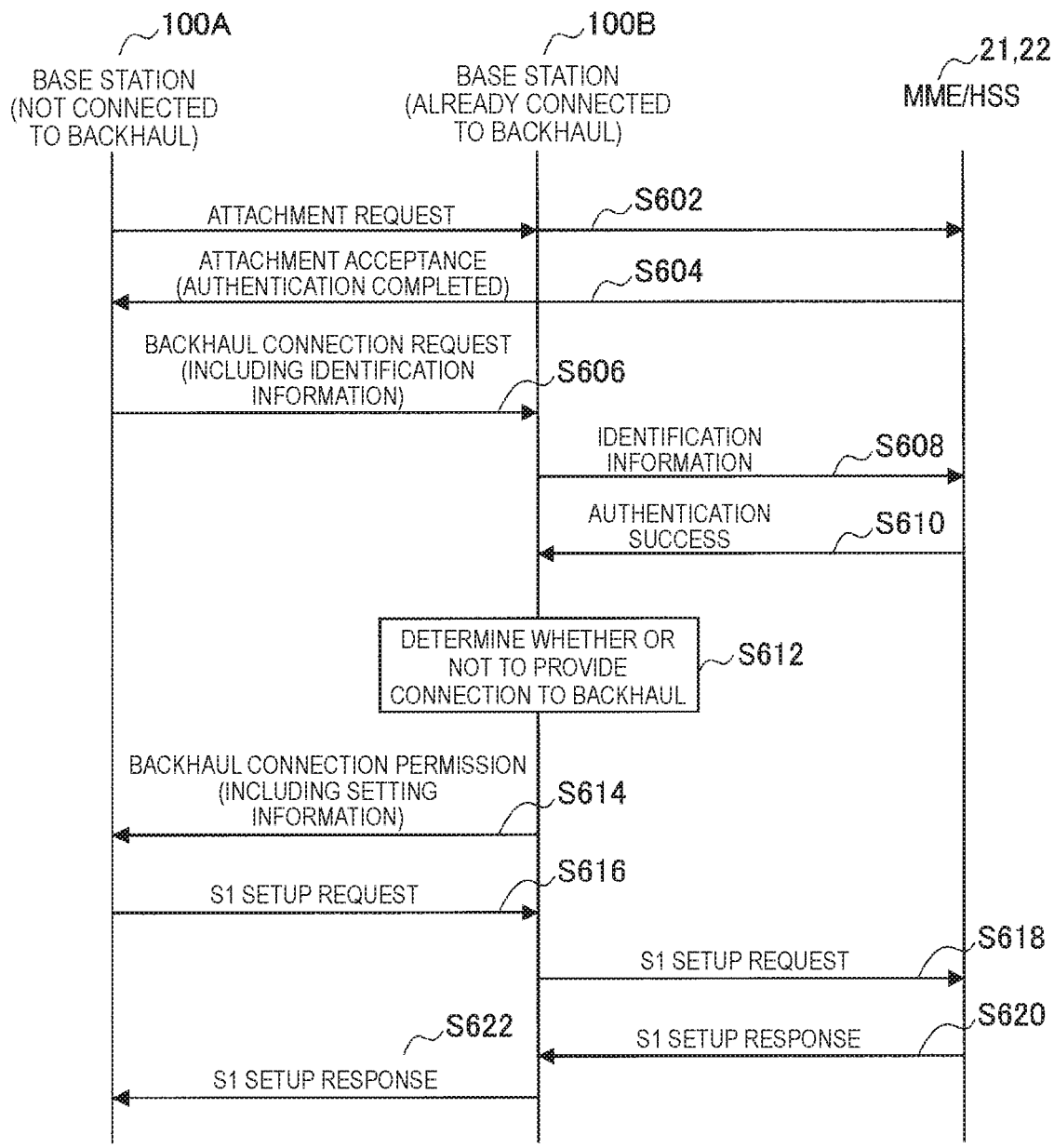
FIG. 16 is a flowchart illustrating an example of a flow of processing of connecting to backhaul that is performed by a base station according to a fifth embodiment.

FIG. 16 is a flowchart illustrating an example of a flow of the processing of establishing connection to the backhaul, which is performed by the base station 100 according to the present embodiment. As illustrated in FIG. 16, the base station 100A first transmits an attachment request to the MME 21 by way of the base station 100B in order to establish connection to the network as a terminal device (Step S602). Then, the MME 21 and the HSS 22 performs authentication on the assumption that the base station 100A is a terminal device, and in a case in which the authentication is successfully performed, the MME 21 and the HSS 22 transmits an attachment acceptance indicating that the authentication is completed to the base station 100A by way of the base station 100B (Step S604). Through the aforementioned procedure, the base station 100A is connected to the core network 20 as a terminal device.

Next, the base station 100A is connected to the backhaul as a base station. First, the base station 100A transmits a backhaul connection request for requesting connection to the backhaul via the wireless communication path to the base station 100B to the base station 10B through RRC signaling, for example (Step S606). Note that the backhaul connection request includes identification information of the base station 100A. Then, the base station 100B transmits the identification information of the base station 100A to the MME 21 (Step S608). Next, the MME 21 and the HSS 22 determine whether or not the base station 100A is a base station that can use backhaul and in a case in which it is determined that the base station 100A can use the backhaul, authentication success is transmitted to the base station 100B (Step S610). Then, the base station 100B determines whether or not the connection to the backhaul is to be provided to the base station 100A (Step S612). For example, the base station 100B determines that the connection to the backhaul is to be provided in a case there is a margin in the capability and the load. In a case in which it is determined that the connection to the backhaul is to be provided, the base station 100B transmits a backhaul connection permission indicating permission of the connection to the base station 100A through RRC signaling, for example (Step S614). Note that the backhaul connection permission includes setting information such as information for specifying a frequency resource (for example, a component carrier) for providing the connection to the backhaul and a permission code for the connection to the backhaul. Next, the base station 100A transmits an S1 setup request to the frequency resource that the setting information indicates (Step S616). Then, the base station 10B transfers the received S1 setup request to the MME 21 (Step S618). Next, the MME 21 transmits a S1 setup response to the base station 100B (Step S620). Then, the base station 100B transfers the received S1 setup response to the base station 100A (Step S622).

Through the aforementioned procedure, the base station 100A can complete the connection to the backhaul and use the backhaul.

Second Procedure

In the first procedure, the base station 100A is initially connected as a terminal device. Since such a procedure is complicated, it is desirable that a simplified procedure be provided. In particular, in a case in which the base station 100B sufficiently owns a frequency resource that can be used to provide the connection to the backhaul, it is desirable that a procedure in which the base station 100A is initially connected as a terminal device be omitted.

Thus, the base station 100B provides a notification of information indicating a frequency resource for which the authentication processing for the wireless connection to the backhaul is not necessary to the base station 100A while including the information in the system information. For example, the base station 100B provides a notification of information for specifying the frequency resource for which the authentication processing is not necessary in the frequency resource (for example, a component carrier) for providing the connection to the backhaul while including the information in the system information. In this manner, the base station 100A can transmit the S1 setup request to the frequency resource, which has been acquired from the received system information, for which the authentication processing is not necessary, and can be connected to the backhaul.

The base station 100A may acquire the information indicating the frequency resource, for which the authentication processing is not necessary for the wireless communication to the backhaul, using set authentication information. In other words, only a specific base station 100A that has predetermined authentication information (for example, an encryption key) may be able to acquire the information indicating the frequency resource, for which the authentication processing is not necessary for the wireless connection to the backhaul. In this manner, it is possible to inhibit excessive alleviation of restriction due to the unnecessity of the authentication by the information indicating the frequency resource, for which the authentication processing is not necessary for the wireless connection to the backhaul, being encrypted.

When the terminal devices 200 establishes connection to the network, the terminal devices 200 perform an authentication procedure after performing random access and establishes a bearer. In contrast, the base station 100A directly executes the S1 setup procedure after the random access using the frequency resource designated by the base station 100B. In this regard, description will be given with reference to FIGS. 17 and 18.

Figure 17:
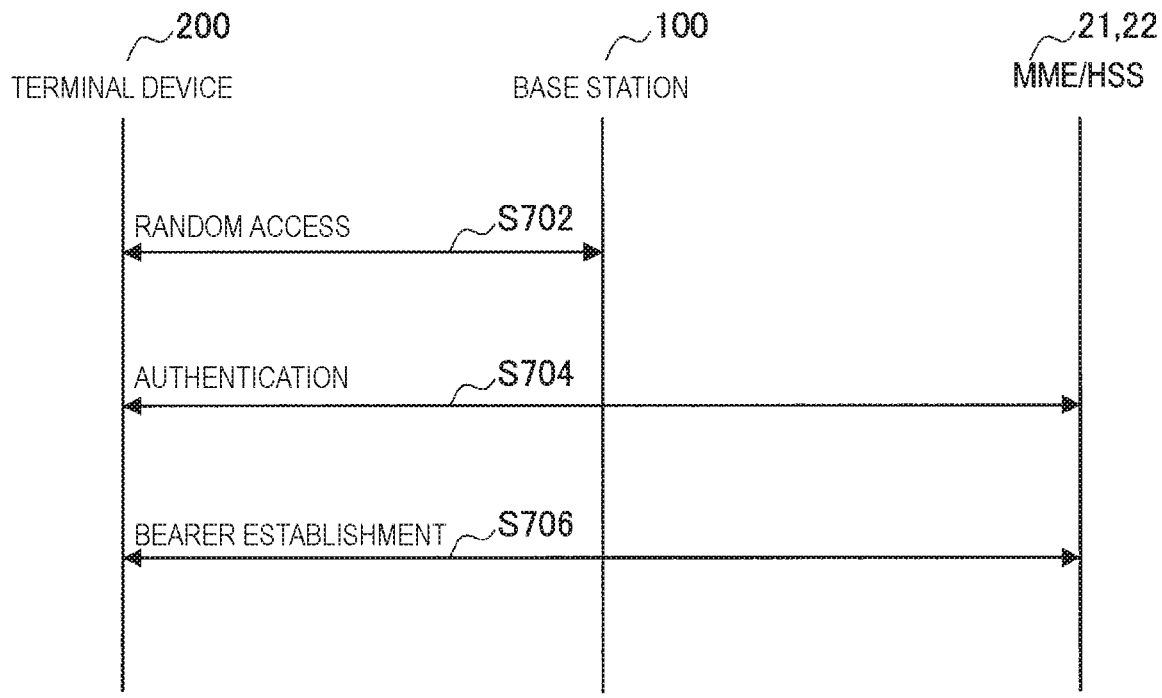
FIG. 17 is a sequence diagram illustrating an example of a flow of processing of connecting to a terminal device that is executed in a cellular system according to the embodiment.

FIG. 17 is a sequence diagram illustrating an example of a flow of connection processing of the terminal devices 200 that is executed in the cellular system 1 according to the present embodiment. As illustrated in FIG. 17, a base station 1(*l*), a terminal devices 200, an MME 221, and an HSS 22 are involved in this sequence. First, the terminal device 200 performs random access to the base station 100 (Step S702). Then, the terminal device 200 performs authentication with the MME 21 and the HSS 22 (Step S704) and then establishes a bearer (Step S706).

Figure 18:
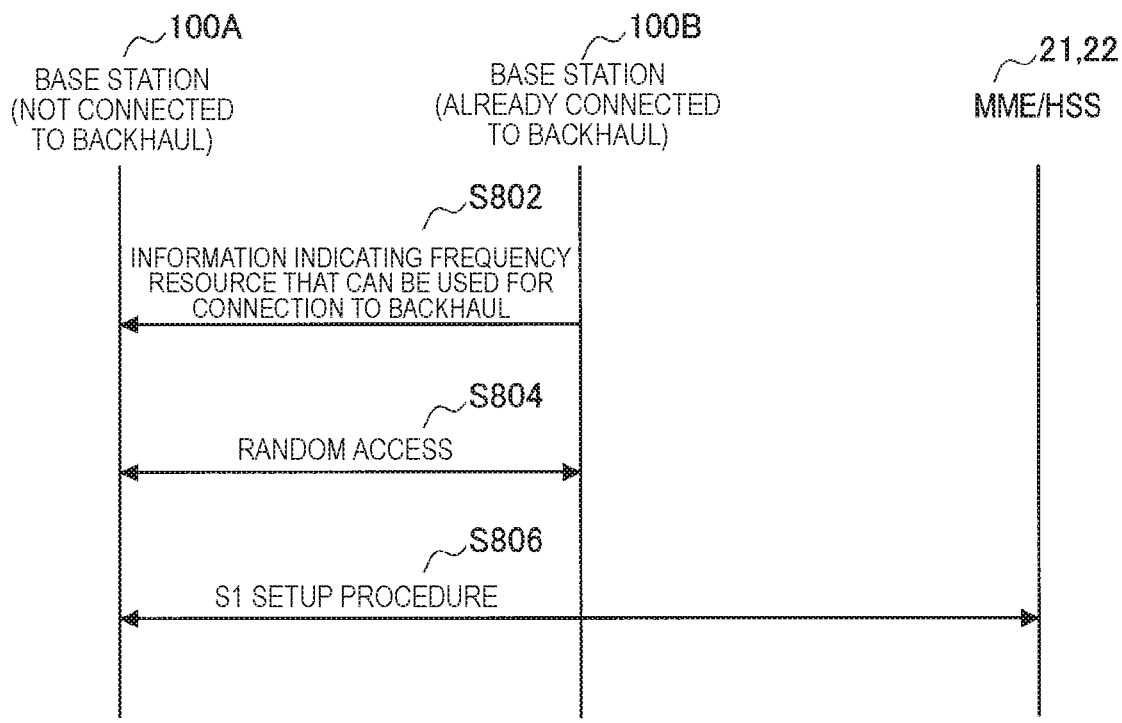
FIG. 18 is a sequence diagram illustrating an example of a flow of processing of connecting to backhaul that is executed by a base station in the cellular system according to the embodiment.

FIG. 18 is a sequence diagram illustrating an example of a flow of processing of establishing connection to the backhaul, which is executed by the base station 100A in the cellular system 1 according to the present embodiment. As illustrated in FIG. 18, the base station 100A, a base station 100B, an MME 21, and an HSS 22 are involved in this sequence. First, information indicating a frequency resource that can be used for the connection to the backhaul (that is, that does not require authentication processing) is transmitted to the base station 100A while being included in the system information (Step S802). Next, the base station 100A performs random access with the base station 100B (Step S804). Then, the base station 100A performs the S1 setup procedure with the MME 21 and the HSS 22 (Step S806). At that time, the base station 100A transmits an S1 setup request to the frequency resource that is specified by the received system information and that can be used for the connection to the backhaul.

As described above, authentication of the base station 100A is performed after the S1 setup procedure is completed in the case of the second procedure. Therefore, the authentication is not performed before the backhaul is used in the second procedure. However, it is possible to apply a specific restriction by limiting the frequency resource to a specific frequency resource for which the second procedure is accepted. Also, in a case in which the information indicating the frequency resource for which the authentication processing for the wireless connection to the backhaul is not necessary is encrypted, further restriction can be applied. In this manner, security is also secured in the second procedure.

8. Sixth Embodiment

The present embodiment is a mode in which dynamical change (for example, addition or deletion) in wireless communication paths included in backhaul, such as connection to new backhaul that is performed by a base station 100 that has already been connected to the backhaul, is appropriately realized.

<8.1. Technical Problem>

A case in which the base station 100 that has already been connected to the backhaul via the wireless communication paths attempt to establish connection through a new route (that is, connection to other new base stations 100) in addition to or instead of the existing route to the backhaul in order to improve quality (in other words, reliability) of the connection to the backhaul is conceivable. Further, a case in which a base station 100 that attempts to establish connection via a new route has already provided connection to the backhaul to the downstream is also conceivable. In that case, in a case in which a base station 100 on the side requested for the connection to the backhaul for the new route permits a request and provides the connection to the backhaul, a significantly large load may be imparted on the base station 100.

Therefore, it is desirable that how large the load is in a case in which the base station 100 on the side requested for the connection to the backhaul for the new route permits the request and provides the connection to the backhaul be able to be predicted.

<8.2. Technical Features>

Technical features of the present embodiment will be described on the assumption of the situation illustrated in FIG. 19.

Figure 19:
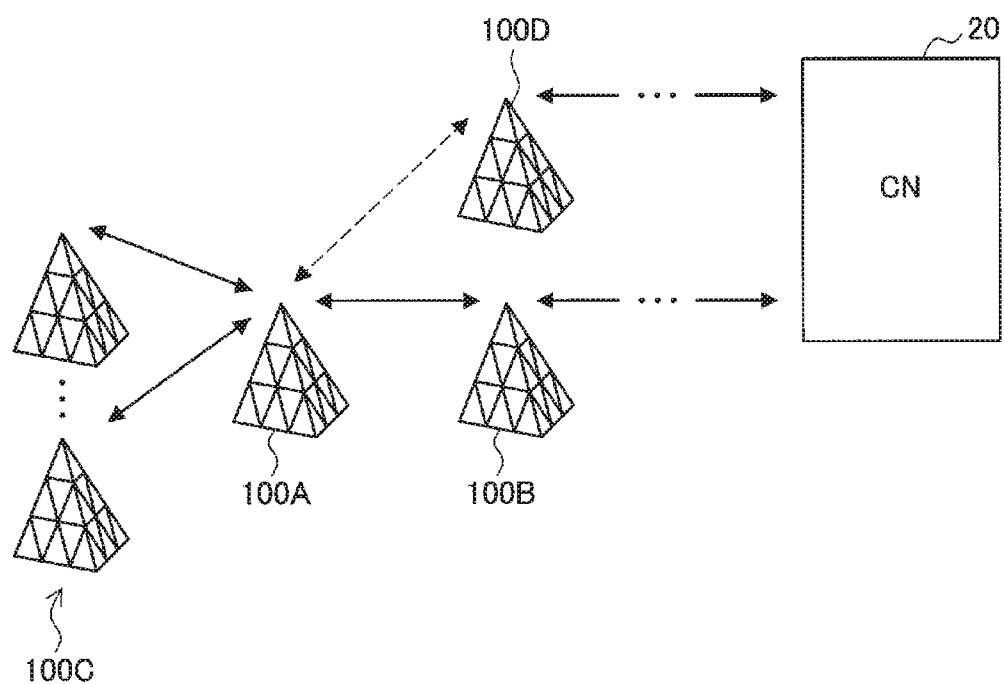
FIG. 19 is a diagram for explaining technical features according to a sixth embodiment.

FIG. 19 is a diagram for explaining technical features according to the present embodiment. As illustrated in FIG. 19, each of a base station 100B (corresponding to a first base station) and a base station 100D (corresponding to a third base station) is connected to the core network 20, that is, to the backhaul. Also, a base station 100A is connected to the backhaul using a wireless communication path to the base station 100B and relays connection to the backhaul of one or more base stations 100C (corresponding to a second base station) on the downstream side using a wireless communication path to the base stations 100C. Note that although an example in which the number of base stations 100B to which the base station 100A has already been connected is one is described here, a plurality of base stations 100B may be provided. In such a situation, the base station 100A provides, to the base station 100D, a notification of a connection request for connection to the backhaul using a wireless communication path to the base station 100D. Note that the connection request may be transmitted using RRC signaling, for example.

The connection request may include various kinds of information for assisting determination regarding connection availability that is made by the base station 100D. Hereinafter, an example thereof will be described.

The connection request may include information related to the base stations 100C that are destinations to which the connection to the backhaul is provided. For example, the information related to the base stations 100C included in the connection request may include a throughput that is provided to the base stations 100C and that relates to the connection to the backhaul using the wireless communication path to the base station 100C. That is, the connection request may include information indicating the throughput of the backhaul to be provided to the base stations 100C. Also, the information that is included in the connection request and that relates to the base stations 100C may include the number of base stations 100C. That is, the connection request may include information indicating the number of base stations C on the downstream side to which the base station 100A provides the connection to the backhaul. The base station 100D can determined the connection availability on the basis of such information.

For example, the connection request may include information related to the base station 100B that is a source from which the connection to the backhaul is provided. For example, the information that is included in the connection request and that relates to the base station 100B may include a throughput that relates to the connection to the backhaul that is provide from the base station 100B and uses the wireless communication path to the base station 100B. That is, the connection request may include information indicating the throughput of the backhaul that is provided from the base station 100B. Also, the information that is included in the connection request and that relates to the base station 100B may include the number of base stations 100B. That is, the connection request may include information indicating the number of base stations B on the upstream that provide the connection to the backhaul to the base station 100A. The base station 100D can determined the connection availability on the basis of such information.

An example of information included in the connection request is illustrated in Table 7 below.

TABLE 7

Example of information included in request for connection to backhaul

| Index | Details | Example of numerical value |
|---|---|---|
| 1 | The number of base stations on downstream to which base station provides backhaul | 10 base stations |
| 2 | The number of base stations on upstream to which base station provides backhaul | 2 base stations |

Here, information of an index 1 is an example of information related to the base stations 100C that are the aforementioned destinations to which the connection to the backhaul is provided, and information of an index 2 is an example of information related to the base station 100B that is the aforementioned source from which the connection to the backhaul is provided.

Meanwhile, the base station 100D determines whether or not the request for connection to the backhaul using the wireless communication path to the base station 100A, which is received from the base station 100A (corresponding to a fourth base station) is to be permitted on the basis of the information that is included in the connection request and that relates to the base station 100B or the information that relates to the base stations 100C. For example, the base station 100D determines connection availability on the basis of whether or not the load imparted to the base station 100D itself is allowable, whether or not it is possible to maintain the throughput of the backhaul that is provided to the base station 100A and the base stations 100C, and the like. Then, the base station 100D replies with information indicating a result of the determination to the base station 100A.

Note that the information indicating the result of the determination may include information indicating a frequency resource (for example, a component carrier) to be used for the wireless connection in a case in which the connection is permitted. Also, the information indicating the result of the determination may include information indicating a condition for the provision of the connection to the backhaul, for example, a condition that only three of ten base stations 100C on the downstream side of the base station 100A can be connected by way of the base station 100D. Also, the information indicating the result of the determination may be transmitted using RRC signaling, for example.

In a case in which the connection is permitted, the base station 100A transmits an S1 setup request to the MME 21. In a case in which the base station 100A is connected to the MME 21 through a plurality of routes, the base station 100A may transmit the S setup request via the plurality of routes.

Meanwhile, the base stations 100C may not transmit the S1 setup request. This is because the base stations 100C have already been connected to the backhaul by way of the base station 100A. It is a matter of course that the base stations 100C may transmit the S1 setup request.

With such a mechanism, each base station 100 can prevent an excessive load and can be connected to the backhaul with an appropriate throughput.

Here, the base station 100A may be connected to the backhaul through a new route or may disconnect an existing route. Therefore, quality of the backhaul that the base station 100A provides may be improved or may be degraded. Thus, the base station 100A provides a notification of information indicating quality of the connection to the backhaul that is provided to the base stations 100C and that uses the wireless communication path to the base stations 100C (hereinafter, also referred to as provision quality information) to the base stations 100C. That is, the base station 100A provides, to the base station 100C, a notification of the provision quality information indicating the quality of the backhaul provided to the base station 100C. For example, the base station 100A provides the notification of the provision quality information at a timing at which a change in the quality of the backhaul provided to the base stations 100C is recognized. As such a timing, a timing at which the connection route of the base station 100A to the backhaul increases or decreases is exemplified.

The base stations 100C recognizes that the quality of the backhaul provided from the base station 100A has been improved or degraded with reference to the provision quality information. In response to the recognition, the base stations 100C can employ a measure, such as increasing/reducing the number of other base stations 100 on the downstream side that are destinations to which the connection to the backhaul is provided or reinforcing a backhaul line (connection to new backhaul and the like).

Note that the provision quality information may be provided as a notification using RRC signaling or system information.

The provision quality information may include various kinds of information. Hereinafter, an example thereof will be described.

The provision quality information may include information indicating a throughput related to the connection to the backhaul using the wireless communication path to the base station 100C. That is, the information indicating quality of the connection to the backhaul may include information indicating the throughput of the backhaul that is provided to the base stations 100C.

The provision quality information may include information indicating a delay time related to the connection to the backhaul using the wireless communication path to the base stations 100C. That is, the information indicating the quality of the connection to the backhaul may include information indicating a delay time of the backhaul that is provided to the base stations 100C.

An example of information included in the provision quality information is illustrated in Table 8 below.

TABLE 8

Example of information included in provision quality information

| Index | Details | Examples of numerical value |
|---|---|---|
| 1 | Maximum value and minimum value of delay time | 2000 ms, 150 ms |
| 2 | Capacity of backhaul line provided to base stations on downstream | 2 Gbyte/second |

Here, information of an index 1 is an example of the aforementioned information indicating the throughput of the backhaul, and information of an index 2 is an example of the aforementioned information indicating the delay time of the backhaul.

Meanwhile, the base stations 100C may transmit the provision quality information provided from the base station 100A to the terminal devices 200 connected to the base stations 100C. For example, the base stations 100C may transmit the provision quality information of the base station 100A while including the provision quality information in the system information. In this manner, the terminal devices 200 can attempt handover to other base stations 100 with satisfactory backhaul quality, for example.

A flow of the processing related to connection of the base station 100 that has already been connected to the backhaul via the wireless communication path to new backhaul as described above will be described with reference to FIGS. 20 and 21.

Figure 20:
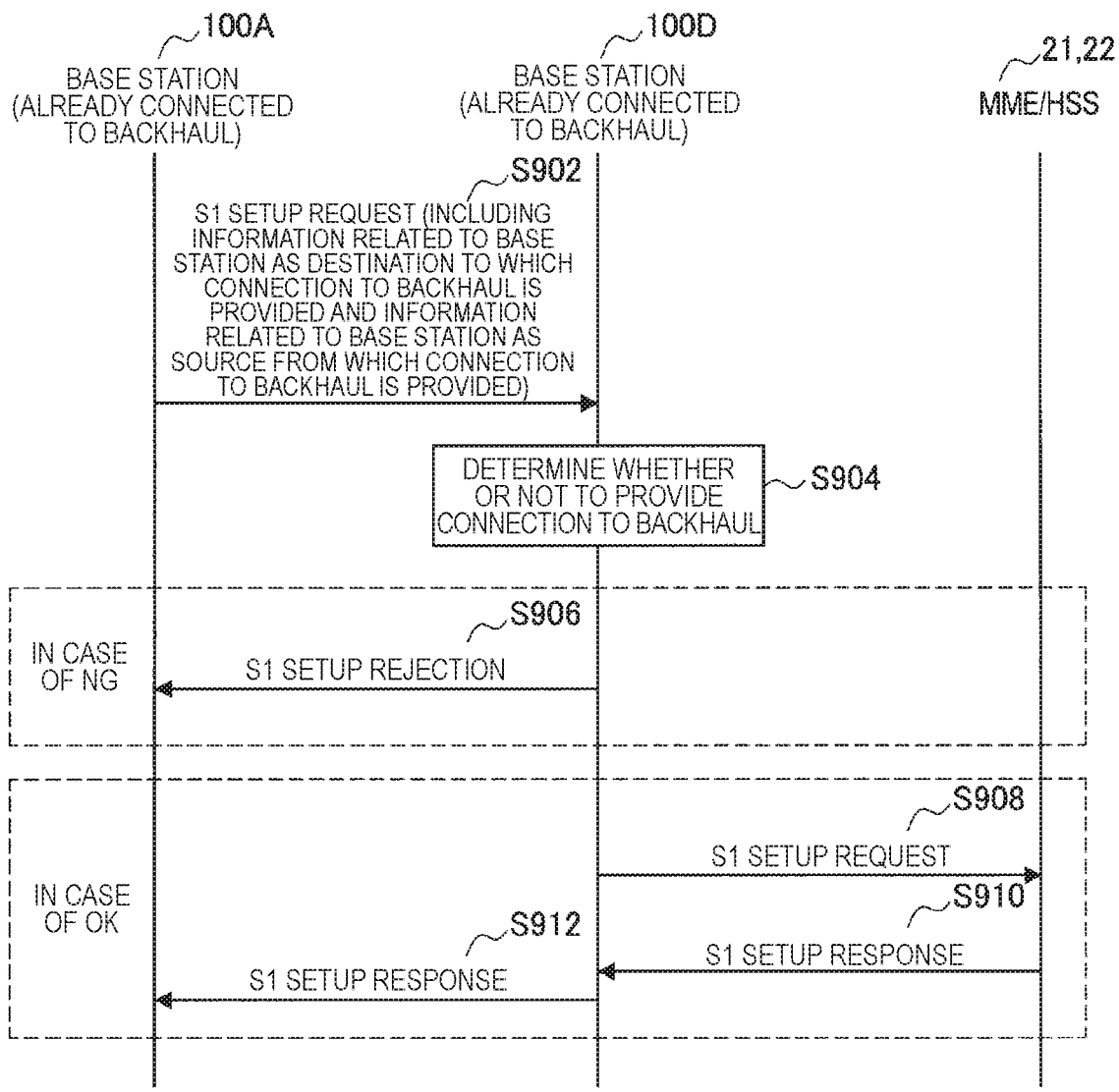
FIG. 20 is a sequence diagram illustrating an example of a flow of processing of connecting to new backhaul that is executed by a base station that has already been connected to backhaul in a cellular system according to the embodiment.

FIG. 20 is a sequence diagram illustrating an example of a flow of processing of establishing connection to new backhaul, which is executed by a base station 100A that has already been connected to backhaul in the cellular system 1 according to the present embodiment. As illustrated in FIG. 20, the base station 100A that has already been connected to the backhaul, a base station 100D that has already been connected to the backhaul, an MME 221, and an HSS 22 are involved in this sequence. First, the base station 100A transmits an S1 setup request including information related to a base stations 100C as a destination to which the connection to the backhaul is provided and information related to a base station 100B as sources from which the connection to the backhaul is provided to the base station 100D (Step S902). Then, the base station 100D determines whether or not to provide the connection to the backhaul to the base station 100A on the basis of the information related to the base station 100C and the information related to the base station 100B received from the base station 100A (Step S904). In a case in which it is determined not to provide the connection to the backhaul (S904/NG), the base station 100D replies with an S1 setup rejection to the base station 100A (Step S906). Meanwhile, in a case in which it is determined to provide the connection to the backhaul (S904/OK), the base station 100D transmits an S1 setup request to the MME 21 and the HSS 22 (Step S908), receives a replied S1 setup response (Step S910), and transfers the S1 setup response to the base station 100A (Step S912).

Figure 21:
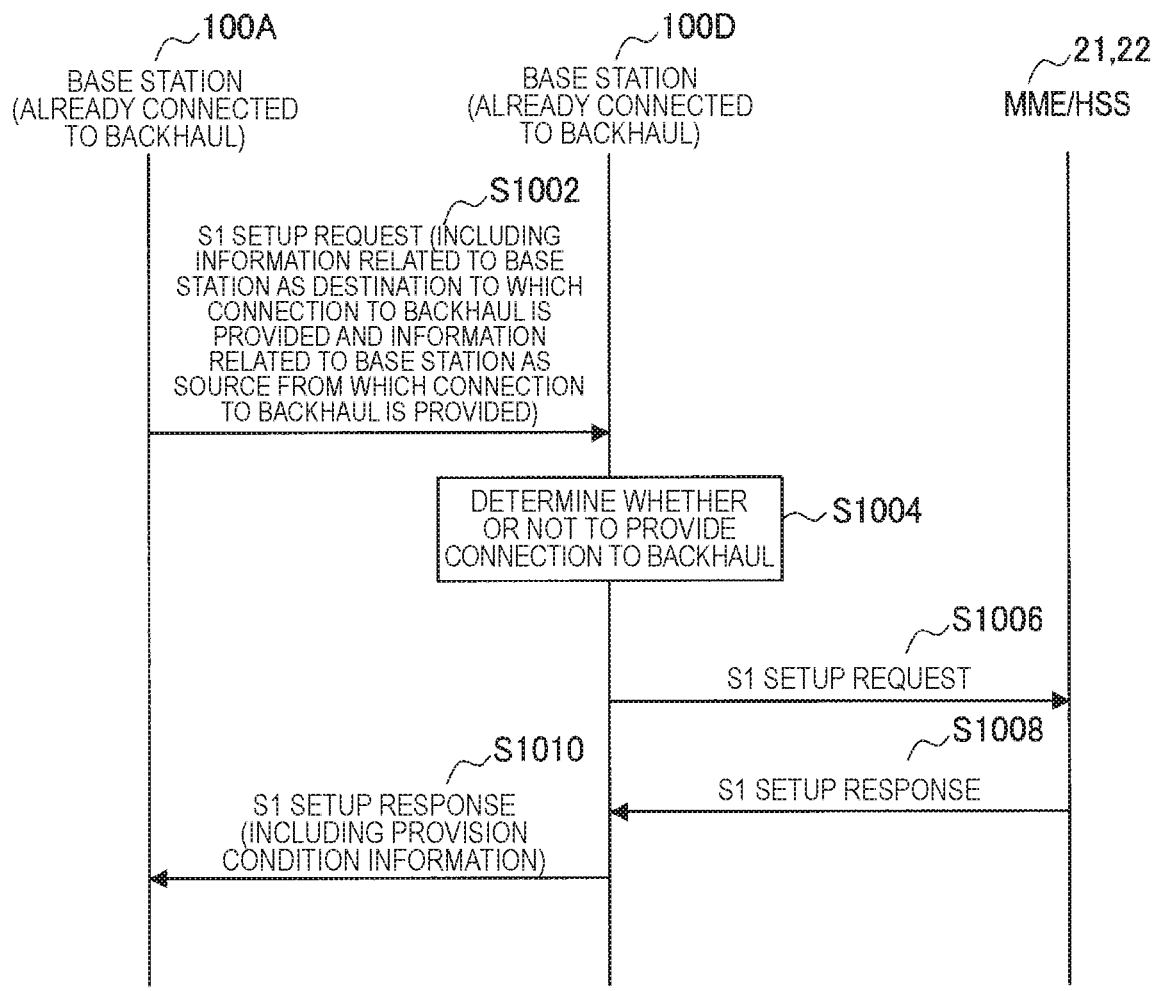
FIG. 21 is a sequence diagram illustrating an example of a flow of processing of connecting to new backhaul that is executed by a base station that has already been connected to backhaul in a cellular system according to the embodiment.

FIG. 21 is a sequence diagram illustrating an example of a flow of processing of establishing connection to new backhaul, which is executed by a base station 100A that has already been connected to backhaul in the cellular system 1 according to the present embodiment. As illustrated in FIG. 21, the base station 100A, a base station 100D, an MME 21, and an HSS 22 are involved in this sequence. First, the base station 100A transmits an S1 setup request including information related to a base station 100C as a destination to which the connection to the backhaul is provided and information related to a base station 100B as sources from which the connection to the backhaul is provided to the base station 100D (Step S1002). Then, the base station 100D determines whether or not to provide the connection to the backhaul to the base station 100A on the basis of the information related to the base station 100C and the information related to the base station 100B received from the base station 100A (Step S1004). Then, the base station 100D transmits an S1 setup request to the MME 21 and the HSS 22 (Step S1006), receives a replied S1 setup response (Step S1008), and transfers the S1 setup response to the base station 100A (Step S1010). Here, the base station 100D includes provision condition information indicating the number of base stations on the downstream side of the base station 100A for which the connection to the backhaul by way of the base station 100D itself is permitted, and the like in the S1 setup response to be transferred to the base station 100A.

9. Application Examples

The technology of the present disclosure can be applied to various products. The base station 100 may be realized as any type of evolved nodeB (eNB), for example, a macro eNB, a small eNB, or the like. A small eNB may be an eNB that covers a smaller cell than a macro cell, such as a pico eNB, a micro eNB, or a home (femto) eNB. Alternatively, the base station 100 may be realized as another type of base station such as a node B or a base transceiver station (BTS). The base station 100 may include a main body that controls wireless communication (also referred to as a base station device) and one or more remote radio heads (RRHs) disposed in a different place from the main body. In addition, various types of terminals to be described below may operate as the base station 100 by temporarily or semi-permanently executing the base station function.

In addition, the terminal device 200 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 200 may be realized as a terminal that performs machine-to-machine (M2M) communication (also referred to as a machine type communication (MTC) terminal). Furthermore, the terminal device 200 may be a wireless communication module mounted in such a terminal (for example, an integrated circuit module configured in one die).

<9.2. Application Example with Regard to Base Station>

First Application Example

Figure 22:
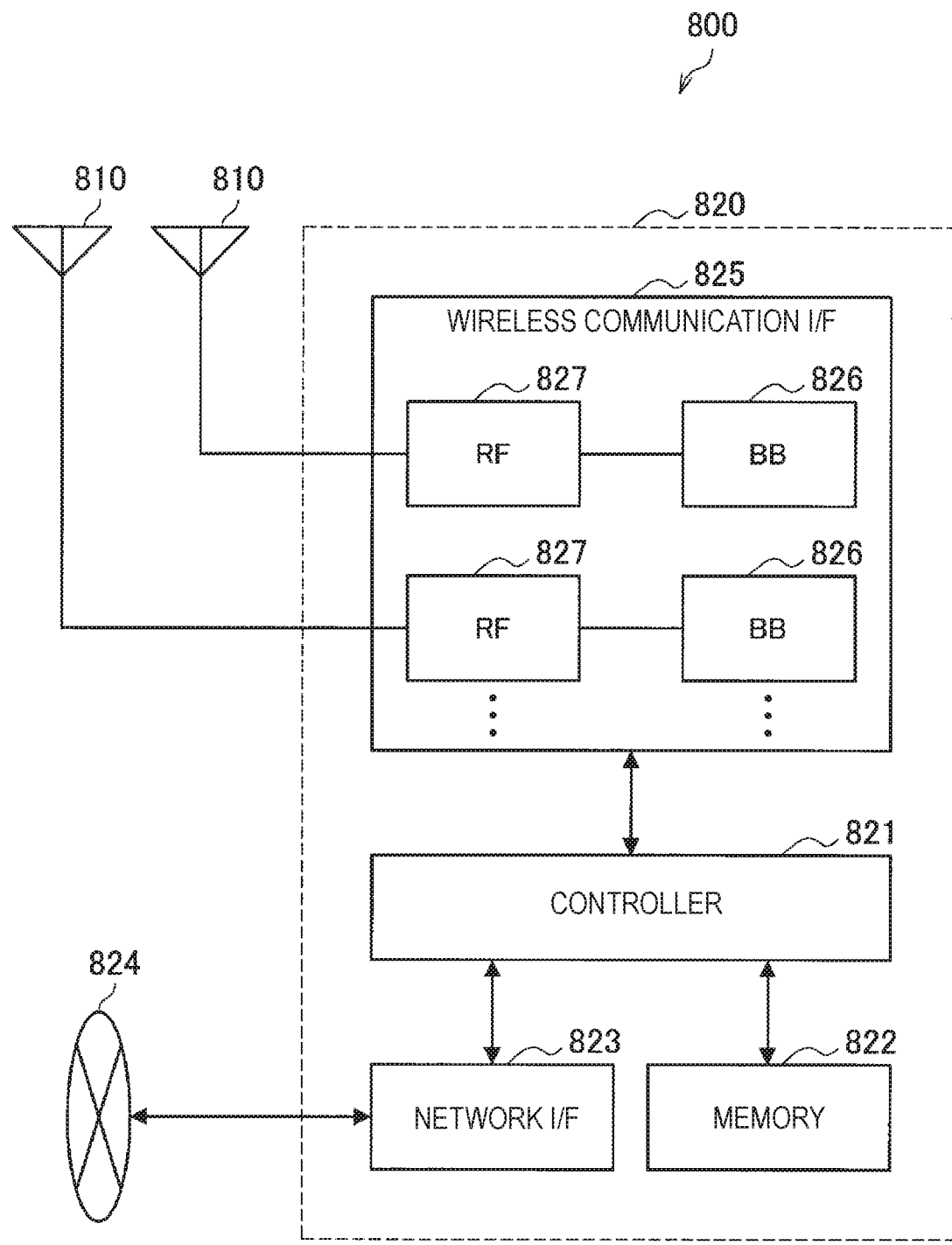
FIG. 22 is a block diagram illustrating a first example of a schematic configuration of an eNB.

FIG. 22 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 22. For example, the multiple antennas 810 may be compatible with multiple frequency bands used by the eNB 800. Although FIG. 22 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In this case, the eNB 800 may be connected to a core network node or another eNB through a logical interface (e.g. S1 interface or X2 interface). The network interface 823 may also be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 22. For example, the multiple BB processors 826 may be compatible with multiple frequency bands used by the eNB 800. The wireless communication interface 825 may include the multiple RF circuits 827, as illustrated in FIG. 22. For example, the multiple RF circuits 827 may be compatible with multiple antenna elements. Although FIG. 22 illustrates the example in which the wireless communication interface 825 includes the multiple BB processors 826 and the multiple RF circuits 827, the wireless communication interface 825 may also include a single BB processor 826 or a single RF circuit 827.

In the eNB 800 shown in FIG. 22, one or more constituent elements included in the processing unit 150 (the backhaul control unit 151 and/or the communication processing unit 153) described with reference to FIG. 7 may be implemented by the wireless communication interface 825. Alternatively, at least some of these constituent elements may be implemented by the controller 821. As an example, a module which includes a part (for example, the BB processor 826) or all of the wireless communication interface 825 and/or the controller 821 may be mounted in eNB 800, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the eNB 800, and the wireless communication interface 825 (for example, the BB processor 826) and/or the controller 821 may execute the program. As described above, the eNB 800, the base station device 820, or the module may be provided as a device which includes the one or more constituent elements, and the program for causing the processor to function as the one or more constituent elements may be provided. In addition, a readable recording medium in which the program is recorded may be provided.

Further, in the eNB 800 illustrated in FIG. 22, the wireless communication unit 120 described above with reference to FIG. 7 may be mounted in the wireless communication interface 825 (for example, the RF circuit 827). Further, the antenna unit 110 may be mounted in the antenna 810. Further, the network communication unit 130 may be mounted in the controller 821 and/or the network interface 823. Further, the storage unit 140 may be mounted in the memory 822.

Second Application Example

Figure 23:
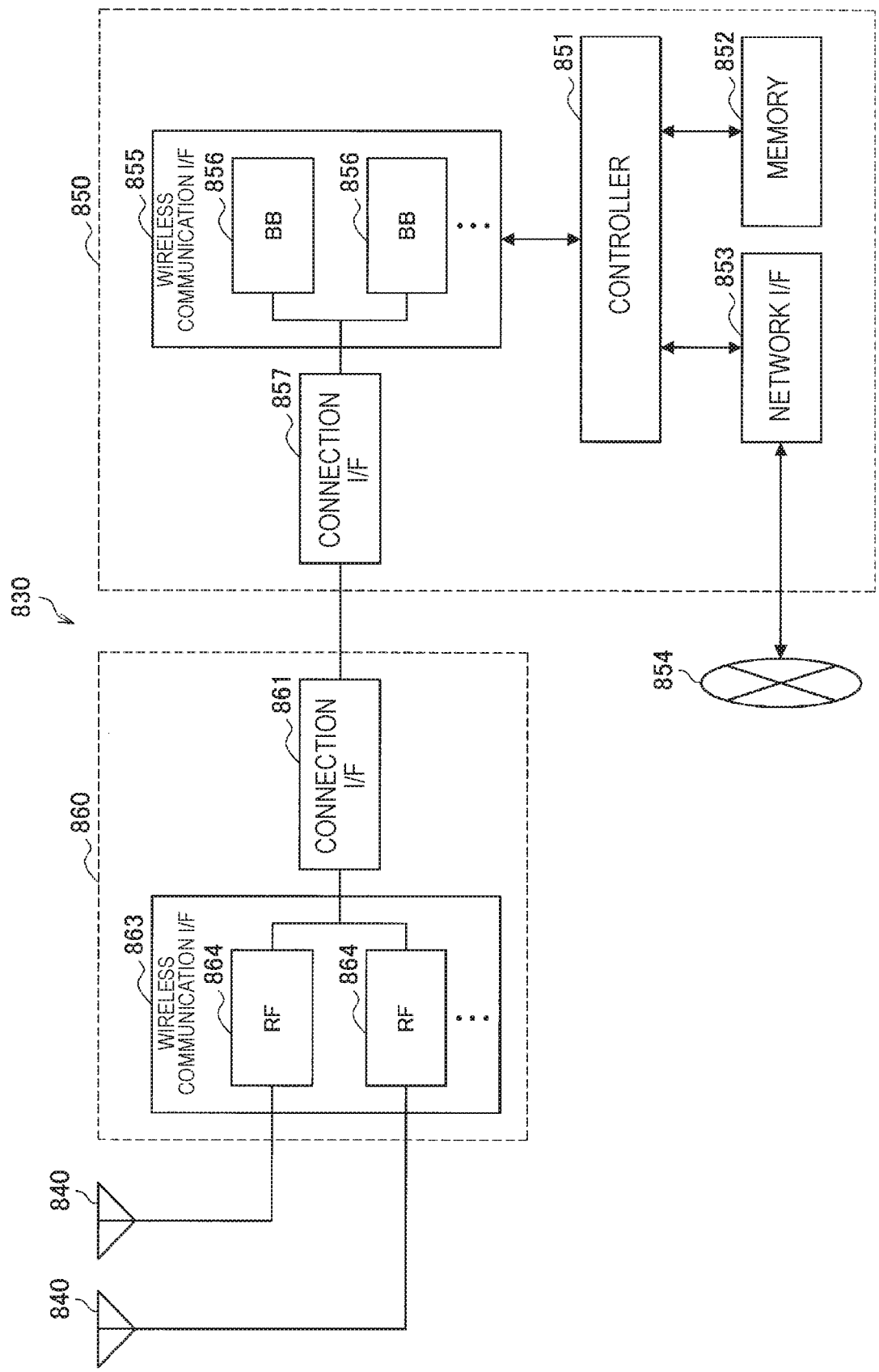
FIG. 23 is a block diagram illustrating a second example of the schematic configuration of the eNB.

FIG. 23 is a block diagram illustrating a second example of a schematic configuration of an eNB to which the technology of the present disclosure may be applied. An eNB 830 includes one or more antennas 840, a base station device 850, and an RRH 86). Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 23. For example, the multiple antennas 840 may be compatible with multiple frequency bands used by the eNB 830. Although FIG. 23 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 22.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is similar to the BB processor 826 described with reference to FIG. 22, except the BB processor 856 is connected to the RF circuit 864 of the RRH 860 via the connection interface 857. The wireless communication interface 855 may include the multiple BB processors 856, as illustrated in FIG. 23. For example, the multiple BB processors 856 may be compatible with multiple frequency bands used by the eNB 830. Although FIG. 23 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 23. For example, the multiple RF circuits 864 may support multiple antenna elements. Although FIG. 23 illustrates the example in which the wireless communication interface 863 includes the multiple RF circuits 864, the wireless communication interface 863 may also include a single RF circuit 864.

In the eNB 830 shown in FIG. 23, one or more constituent elements included in the processing unit 150 (the backhaul control unit 151 and/or the communication control unit 153) described with reference to FIG. 7 may be implemented by the wireless communication interface 855 and/or the wireless communication interface 863. Alternatively, at least some of these constituent elements may be implemented by the controller 851. As an example, a module which includes a part (for example, the BB processor 856) or all of the wireless communication interface 855 and/or the controller 851 may be mounted in eNB 830, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the eNB 830, and the wireless communication interface 855 (for example, the BB processor 856) and/or the controller 851 may execute the program. As described above, the eNB 830, the base station device 850, or the module may be provided as a device which includes the one or more constituent elements, and the program for causing the processor to function as the one or more constituent elements may be provided. In addition, a readable recording medium in which the program is recorded may be provided.

Further, in the eNB 830 illustrated in FIG. 23, for example, the wireless communication unit 120 described above with reference to FIG. 7 may be mounted in the wireless communication interface 863 (for example, the RF circuit 864). Further, the antenna unit 110 may be mounted on the antenna 840. Further, the network communication unit 130 may be mounted in the controller 851 and/or the network interface 853. Further, the storage unit 140 may be mounted in the memory 852.

<9.2. Application Example with Regard to Terminal Device>

First Application Example

Figure 24:
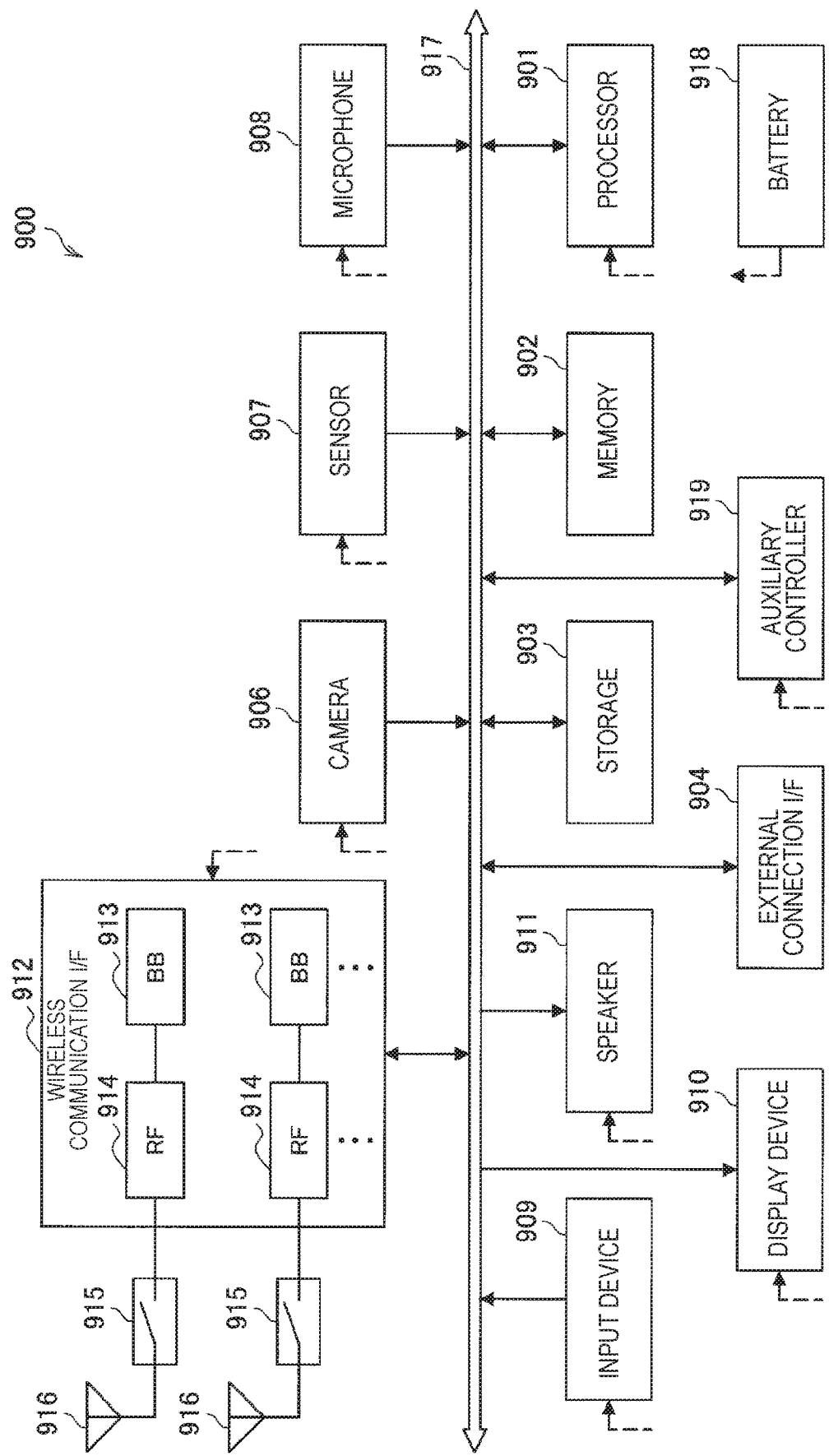
FIG. 24 is a block diagram illustrating an example of a schematic configuration of a smartphone.

FIG. 24 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 24. Although FIG. 24 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 24. Although FIG. 24 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 24 via feeder lines, which are partially shown as dashed lines in the figure. The auxiliary controller 919 operates a minimum necessary function of the smartphone 900, for example, in a sleep mode.

In the smartphone 900 shown in FIG. 24, one or more constituent elements included in the processing unit 240 (the acquiring unit 241 and/or the communication control unit 243) described with reference to FIG. 8 may be implemented by the wireless communication interface 912. Alternatively, at least some of these constituent elements may be implemented by the processor 901 or the auxiliary controller 919. As an example, a module which includes a part (for example, the BB processor 913) or all of the wireless communication interface 912, the processor 901 and/or the auxiliary controller 919 may be mounted in the smartphone 900, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the smartphone 900, and the wireless communication interface 912 (for example, the BB processor 913), the processor 901 and/or the auxiliary controller 919 may execute the program. As described above, the smartphone 900 or the module may be provided as a device which includes the one or more constituent elements, and the program for causing the processor to function as the one or more constituent elements may be provided. In addition, a readable recording medium in which the program is recorded may be provided.

In the smartphone 900 illustrated in FIG. 24, for example, the wireless communication unit 220 described above with reference to FIG. 8 may be mounted in the wireless communication interface 912 (for example, the RF circuit 914). Further, the antenna unit 210 may be mounted on the antenna 916. Further, the storage unit 230 may be mounted in the memory 902.

Second Application Example

Figure 25:
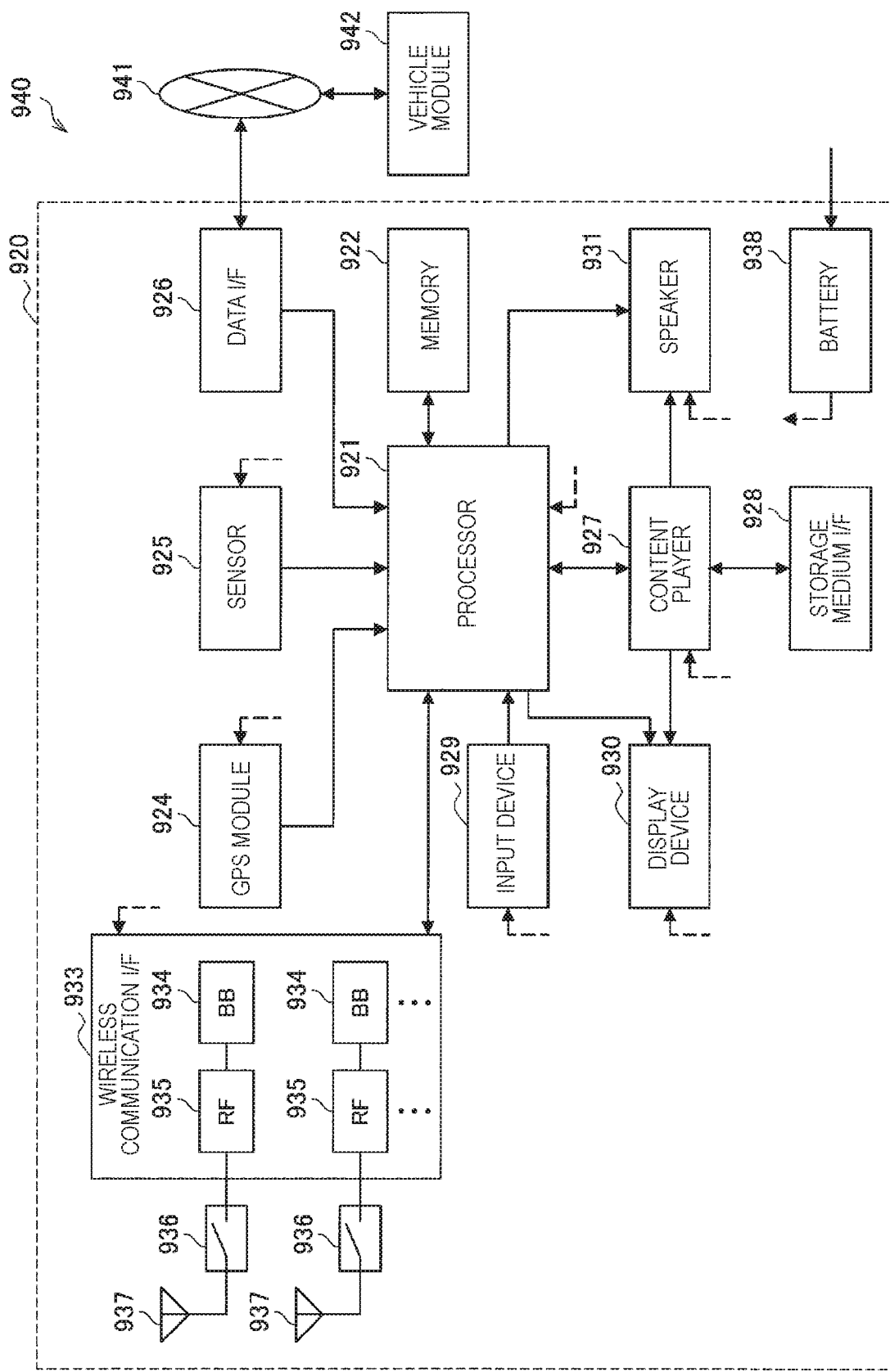
FIG. 25 is a block diagram illustrating an example of a schematic configuration of a car navigation device.

FIG. 25 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as an LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 25. Although FIG. 25 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 25. Although FIG. 25 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 25 via feeder lines that are partially shown as dashed lines in the figure. The battery 938 accumulates power supplied from the vehicle.

In the car navigation device 920 shown in FIG. 25, one or more constituent elements included in the processing unit 240 (the acquiring unit 241 and/or the communication control unit 243) described with reference to FIG. 8 may be implemented by the wireless communication interface 933. Alternatively, at least some of these constituent elements may be implemented by the processor 921. As an example, a module which includes a part (for example, the BB processor 934) or all of the wireless communication interface 933 and/or the processor 921 may be mounted in the car navigation device 920, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the car navigation device 920, and the wireless communication interface 933 (for example, the BB processor 934) and/or the processor 921 may execute the program. As described above, the car navigation device 920 or the module may be provided as a device which includes the one or more constituent elements, and the program for causing the processor to function as the one or more constituent elements may be provided. In addition, a readable recording medium in which the program is recorded may be provided.

Further, in the car navigation device 920 illustrated in FIG. 25, for example, the wireless communication unit 220 described above with reference to FIG. 8 may be mounted in the wireless communication interface 933 (for example, the RF circuit 935). Further, the antenna unit 210 may be mounted on the antenna 937. Further, the storage unit 230 may be mounted in the memory 922.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

10. Conclusion

The embodiment of the present disclosure has been described above in detail with reference to FIGS. 1 to 25.

For example, the base station 100 according to the embodiment is connected to the S1-MME interface and the S1-U interface. Both the communication route in which the S1-MME interface is formed and the communication route in which the S1-U interface is formed include a wireless communication path formed between the first base station and the second base station. It is possible to use the common wired communication path among a plurality of interfaces in this manner and thereby to flexibly construct the backhaul including the wireless communication paths.

Also, the base station 100 according to the embodiment is connected to the backhaul including the S1-MME interface using the wireless communication paths to other base stations 100 and provides a notification of the information related to the connected backhaul while including the information in the system information. In this manner, the terminal devices 200 or other base stations 100 that are connected to or attempt to be connected to the base station 100 can appropriately make various kinds of determination such as availability of connection or necessity of switching in relation to the communication with the base station 100.

Also, the base station 100 according to the present embodiment performs the authentication processing for establishing connection to the backhaul using the wireless communication paths to other base stations 100 that are connected to the backhaul. In this manner, since only the permitted base stations 100 can be connected to the backhaul, it is possible to curb unnecessary consumption of the backhaul including the wireless communication paths.

In addition, the base station 100 according to the embodiment is connected to the backhaul using a wireless communication path to the first base station that is connected to the backhaul, relays connection of one or more second base stations on the downstream side to the backhaul using a wireless communication path to the second base station, and provides a notification of a connection request for the connection to the backhaul to a third base station using a wireless communication path to the third base station. In this manner, the third base station can appropriately predict a load in a case in which the connection request is permitted, and it is possible to avoid a situation in which a significantly load is imparted due to permission.

Also, the terminal device 200 according to the embodiment performs processing based on information that is provided as a notification from the base station 100 connected to the backhaul including the S1-MME interface using the wireless communication paths to other base stations 100, that is included in the system information, and that relates to the backhaul. In this manner, the terminal devices 200 can perform appropriate processing such as an attempt of handover in accordance with quality or the like of the backhaul to which the base station 100 is connected.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although the aforementioned embodiments have been described using names in LTE, such as the MME or the S1-MME interface, the technology according to the embodiment can similarly be applied to NR. Also, although the above description has been given in relation to the S1-MME interface and the S1-U interface, the technology according to the present embodiment may be applied to other interfaces. For example, the base station 100 may provide a notification of information related to the X2 interface while including the information in the system information.

Also, the aforementioned respective embodiments can appropriately be combined.

Note that it is not necessary for the processes described in this specification with reference to the flowchart and the sequence diagram to be executed in the order shown in the flowchart. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A base station including:
a processing unit that is connected to backhaul including a first logical interface with a first control entity related to a control plane and a second logical interface with a second control entity related to a user plane,
in which both a communication route in which the first logical interface is formed and a communication route in which the second logical interface is formed include wireless communication paths formed between a first base station and a second base station.

(2)
The base station according to (1), in which the communication route in which the first logical interface is formed and the communication route in which the second logical interface is formed include mutually different wireless communication paths.

(3)
The base station according to (1) or (2), in which on the wireless communication path in which the first logical interface or the second logical interface is formed, signals from a base station on a downstream side on which the number of relays from the first control entity or the second control entity is larger are multiplexed.

(4)
The base station according to any one of (1) to (3), in which the base station on the communication route in which the first logical interface or the second logical interface is formed transparently transfers a signal from a downstream side to an upstream side or a signal from the upstream side to the downstream side.

(5)
The base station according to any one of (1) to (4), in which the processing unit forms the wireless communication path for the first logical interface using a frequency resource of a lower frequency than that of the wireless communication path for the second logical interface.

(6)
The base station according to any one of (1) to (5), in which the processing unit is connected to the first logical interface that goes through a smaller number of base stations as compared with the second logical interface.

(7)
The base station according to any one of (1) to (6), in which the processing unit forms the wireless communication path for the first logical interface using a frequency resource of a frequency that is less influenced by rainfall.

(8)
The base station according to any one of (1) to (7), in which the processing unit exchanges information related to the communication route in which the first logical interface or the second logical interface is formed with another base station.

(9)
The base station according to any one of (1) to (8), in which the processing unit includes at least any of a delay request, a signal-to-noise ratio (SN) request, or a reliability request in an S1 setup request.

(10)
A base station including:
a processing unit that is connected to backhaul including a first logical interface with a control entity related to a control plane using a wireless communication path to another base station and that provides a notification of information related to the backhaul while including the information in system information.

(11)
The base station according to (10), in which the processing unit transmits a predetermined signal to a terminal device until a first predetermined time is reached in a case in which the first logical interface is disconnected.

(12)
The base station according to (11), in which the predetermined signal includes at least any of a reference signal, a synchronization signal, or the system information.

(13)
The base station according to (11) or (12), in which the processing unit stops transmission of the predetermined signal to the terminal device in a case in which the first predetermined time is reached.

(14)
The base station according to any one of (10) to (13), in which the processing unit accumulates uplink data from the terminal device until a second predetermined time is reached or until the first logical interface is restored in a case in which the first logical interface is disconnected.

(15)
The base station according to (14), in which the processing unit deletes the accumulated uplink data in a case in which the second predetermined time is reached and transfers the accumulated uplink data in a case in which the first logical interface is restored before the second predetermined time is reached.

(16)
The base station according to any one of (10) to (15), in which the processing unit continues to provide a service to a terminal device using a communicable application server in a case in which the first logical interface is disconnected.

(17)

The base station according to any one of (10) to (16), in which the information related to the backhaul includes information indicating a state of the control plane.

(18)

The base station according to any one of (10) to (17), in which the information related to the backhaul includes information indicating a state of a user plane.

(19)

The base station according to any one of (10) to (18), in which the backhaul includes a second logical interface with a control entity related to a user plane, and the information related to the backhaul includes information indicating a delay time of the backhaul corresponding to a frequency resource that the base station provides.

(20)

The base station according to any one of (10) to (19), in which the information related to the backhaul includes information indicating another base station to be connected.

(21)

The base station according to any one of (10) to (20), in which the processing unit transmits information indicating a delay time of the backhaul corresponding to a frequency resource that the base station provides to another base station.

(22)

The base station according to any one of (10) to (21), in which the information related to the backhaul includes information indicating whether or not connection using a wireless communication path to the backhaul is able to be provided to another base station.

(23)

A base station including:

a processing unit that performs authentication processing for connecting to backhaul including a logical interface with a control entity using a wireless communication path to a first base station that is connected to the backhaul.

(24)

The base station according to (23), in which the processing unit performs the authentication processing by serving as a terminal device that is connected to the first base station and performs wireless communication.

(25)

The base station according to (23) or (24), in which the processing unit replies with information indicating whether or not connection is able to be established in response to a request for connection to the backhaul from a second base station.

(26)

The base station according to (25), in which the processing unit inquires of the control entity related to the control plane regarding whether or not the request for connection to the backhaul from the second base station is to be permitted.

(27)

The base station according to (25) or (26), in which the processing unit provides a notification of information indicating a frequency resource for which the authentication processing is not needed to the second base station while including the information in system information.

(28)

The base station according to (27), in which the processing unit acquires information indicating a frequency resource for which the authentication processing is not needed, using set authentication information.

(29)

A base station including:

a processing unit that is connected to backhaul including a logical interface with a control entity using a wireless communication path to first base stations that are connected to the backhaul, relays connection of one or more second base stations on a downstream side to the backhaul using a wireless communication path to the second base stations, and provides a notification of a connection request for connection to the backhaul to a third base station using a wireless communication path to the third base station.

(30)

The base station according to (29), in which the request for connection includes information related to the second base stations.

(31)

The base station according to (30), in which the information related to the second base stations includes a throughput that is provided to the second base stations and that relates to connection to the backhaul using the wireless communication path to the second base stations.

(32)

The base station according to (30) or (31), in which the information related to the second base stations includes the number of the second base stations.

(33)

The base station according to any one of (29) to (32), in which the request for connection includes information related to the first base stations.

(34)

The base station according to (33), in which the information related to the first base stations includes a throughput that is provided from the first base stations and that relates to connection to the backhaul using a wireless communication path to the first base stations.

(35)

The base station according to (33) or (34), in which the information related to the first base stations includes the number of the first base stations.

(36)

The base station according to any one of (29) to (35), in which the processing unit determines whether or not a request for connection to the backhaul using a wireless communication path to a fourth base station from the fourth base station is to be permitted on the basis of information related to the first base stations or information related to the second base stations included in the request for connection.

(37)

The base station according to any one of (29) to (36), in which the processing unit provides a notification of information that is provided to the second base stations and that indicates quality of connection to the backhaul using a wireless communication path to the second base stations to the second base stations.

(38)

The base station according to (37), in which the information that indicates the quality includes information indicating a throughput.

(39)

The base station according to (37) or (38), in which the information that indicates the quality includes information indicating a delay time.

(40)

The base station according to any one of (37) to (39), in which the processing unit provides a notification of information related to a change in the quality using RRC signaling or system information.

(41)

A terminal device including:
a processing unit that performs, on backhaul including a first logical interface with a control entity related to a control plane, processing based on information that is provided as a notification from a base station connected using a wireless communication path to another base station, that is included in system information, and that relates to the backhaul.

REFERENCE SIGNS LIST 1 cellular system
11 cell
20 core network
30 internet
100 base station
110 antenna unit
120 wireless communication unit
130 network communication unit
140 storage unit
150 processing unit
151 backhaul control unit
153 communication control unit
200 terminal device
210 antenna unit
220 wireless communication unit
230 storage unit
240 processing unit
241 acquiring unit
243 communication control unit

The invention claimed is:

1. A base station comprising:
a processing unit that is connected to backhaul including a first logical interface with a first control entity related to a control plane and a second logical interface with a second control entity related to a user plane,
wherein both a communication route in which the first logical interface is formed and a communication route in which the second logical interface is formed include wireless communication paths formed between a first base station and a second base station, and
wherein the communication route in which the first logical interface is formed and the communication route in which the second logical interface is formed include mutually different wireless communication paths prior to reaching the first and second control entities.

2. The base station according to claim 1, wherein the base station on the communication route in which the first logical interface or the second logical interface is formed transparently transfers a signal from a downstream side to an upstream side or a signal from the upstream side to the downstream side.

3. The base station according to claim 1, wherein the processing unit forms the wireless communication path for the first logical interface using a frequency resource of a lower frequency than that of the wireless communication path for the second logical interface.

4. The base station according to claim 1, wherein the processing unit is connected to the first logical interface that goes through a smaller number of base stations as compared with the second logical interface.

5. The base station according to claim 1, wherein the processing unit forms the wireless communication path for the first logical interface using a frequency resource of a frequency that avoids rainfall attenuation.

6. The base station according to claim 1, wherein the processing unit exchanges information related to the communication route in which the first logical interface or the second logical interface is formed with another base station.

7. The base station according to claim 1, wherein the processing unit includes at least any of a delay request, a signal-to-noise ratio (SN) request, or a reliability request in an S1 setup request.

* * * * *